US006574699B1

(12) United States Patent
Dobbek

(10) Patent No.: US 6,574,699 B1
(45) Date of Patent: Jun. 3, 2003

(54) FAST TRACK REASSIGN IN A ROTATING STORAGE MEDIA

(75) Inventor: Jeff J. Dobbek, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/456,890

(22) Filed: Dec. 7, 1999

(51) Int. Cl.$^7$ .............................................. G06F 12/00
(52) U.S. Cl. ......................... 711/4; 711/201; 711/202; 707/205; 714/700
(58) Field of Search ........................... 360/75.76, 78.08; 369/30.01; 707/205; 711/4, 111, 112, 201, 202; 714/700

(56) References Cited

U.S. PATENT DOCUMENTS

| | | | |
|---|---|---|---|
| 5,235,585 A | 8/1993 | Bish et al. | 369/54 |
| 5,450,251 A | 9/1995 | Kitagawa | 360/48 |
| 5,568,606 A | 10/1996 | Dobbek | 395/182.06 |
| 5,583,842 A | * 12/1996 | Wilson et al. | 369/53.17 |
| 5,818,654 A | * 10/1998 | Reddy et al. | 360/53 |
| 6,442,715 B1 | * 8/2002 | Wilson | 714/710 |

FOREIGN PATENT DOCUMENTS

| | | |
|---|---|---|
| JP | 6084283 | 3/1994 |
| JP | 7272407 | 10/1995 |
| JP | 9035423 | 2/1997 |
| WO | WO 95/24038 | 9/1995 |
| WO | WO 96/27882 | 9/1996 |

OTHER PUBLICATIONS

U.S. patent application Ser. No. 08/853,978, Dobbek et al., filed May 9, 1997, pending.
U.S. patent application Ser. No. 08/958,774, Kibashi et al., filed Oct. 25, 1996, pending.
J. A. Boscove and R.P. Merle, "Scattering of Alternate Sectors for Magnetic Disk Storage Devices"—Mar. 1993, *IBM Technical Disclosure Bulletin*, vol. 25, No. 10.

"Merge Defective Data Sector List into Primary Defect List at Maintenance"—Sep. 1997, *IBM Technical Disclosure Bulletin*, vol. 40, No. 9.

* cited by examiner

*Primary Examiner*—Do Hyun Yoo
*Assistant Examiner*—Christian P. Chace
(74) *Attorney, Agent, or Firm*—Robert O. Guillot; IPLO Intellectual Property Law Offices

(57) ABSTRACT

A reassign process is provided in a disk drive system including a plurality of tracks for storing data, each of the tracks being divided into a plurality of sectors, each sector having a corresponding logical address value associated therewith. Each track has a corresponding skew associated therewith and having a nominal skew value providing adequate time for sequential access of the corresponding track from a sequentially preceding track. The reassign process is operative to reassign data sectors stored in a reassign span including a first partial track having a reassign sector, a second partial track having a spare sector corresponding with the reassign sector, and at least one intermediate track disposed between the first and second partial tracks. The reassign process includes adjusting the nominal skew value of at least one of the intermediate tracks by a corresponding skew delta adjustment value so that the logical address values associated with the sectors of the intermediate track are transposed thereby effectively shifting data stored in selected sectors of the intermediate track in a direction of the spare sector relative to the reassign sector.

21 Claims, 27 Drawing Sheets

| 60 |
|---|
| CURRENT ZONE TABLE ENTRY |
| CURRENT FLBA |
| NEXT BOUNDARY FLBA |
| NON-SKIP SECTORS UNTIL NEXT BOUNDARY FLBA |
| CURRENT VT POINTER |
| BEGINNING VT POINTER |
| ENDING VT POINTER |
| CURRENT SPINDLE SYNCHRONIZATION ZONE |
| CURRENT RAW SKEW |
| CURRENT SYNC SKEW |
| CURRENT TOTAL SKEW |
| CURRENT CYLINDER |
| CURRENT SECTOR |
| SECTORS LEFT TIL REAL BOUNDARY |
| CURRENT HEAD |
| CYLINDERS LEFT IN SSZ |
|  |
| CURRENT STATE |
| STARTING SECTOR |
| BLOCKS TO TRANSFER |
| NUMBER OF SKIP SECTORS ON TRACK |
| MAX NUMBER OF SKIP SECTORS PER TRACK |

FIG. 3

FIG. 8A — NO SKIPS, SKEW = 1

| PHYS. SECTORS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| FLBA NO. | 115 | 100 | 101 | 102 | 103 | 104 | 105 | 106 | 107 | 108 | 109 | 110 | 111 | 112 | 113 | 114 |
| LOG. SECTORS | 15 | 0 | 1 | 2 | 3 | 4 | 5 | 6 | 7 | 8 | 9 | 10 | 11 | 12 | 13 | 14 |
| NEW FLBA | 99 | 100 | 101 | 102 | 103 | 104 | 105 | 106 | 107 | 108 | 109 | 110 | 111 | 112 | 113 | 114 |
| NEW LOG. | 0 | 1 | 2 | 3 | 4 | 5 | 6 | 7 | 8 | 9 | 10 | 11 | 12 | 13 | 14 | 15 |

FIG. 8B — SKIPS MID LOGICAL TRACK, SKEW = 1

| PHYS. SECTORS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| FLBA NO. | 111 | 100 | 101 | 102 | 103 | Y | Y | Y | Y | 104 | 105 | 106 | 107 | 108 | 109 | 110 |
| LOG. SECTORS | 15 | 0 | 1 | 2 | 3 | Y | Y | Y | Y | 8 | 9 | 10 | 11 | 12 | 13 | 14 |
| NEW FLBA | 99 | 100 | 101 | 102 | 103 | Y | Y | Y | Y | 104 | 105 | 106 | 107 | 108 | 109 | 110 |
| NEW LOG. | 0 | 1 | 2 | 3 | 4 | 5 | 6 | 7 | 8 | 9 | 10 | 11 | 12 | 13 | 14 | 15 |

FIG. 8C — SKIPS LOGICAL TRACK START & MID, SKEW = 1 (320)

| PHYS. SECTORS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| FLBA NO. | 110 | Y | Y | 100 | 101 | 102 | Y | Y | Y | 103 | 104 | 105 | 106 | 107 | 108 | 109 |
| LOG. SECTORS | 15 | 0 | 1 | 2 | 3 | 4 | 5 | 6 | 7 | 8 | 9 | 10 | 11 | 12 | 13 | 14 |
| NEW FLBA | 99 | Y | Y | 100 | 101 | 102 | Y | Y | Y | 103 | 104 | 105 | 106 | 107 | 108 | 109 |
| NEW LOG. | 0 | 1 | 2 | 3 | 4 | 5 | 6 | 7 | 8 | 9 | 10 | 11 | 12 | 13 | 14 | 15 |

FIG. 8D — SKIPS MID & LOGICAL TRACK END, SKEW = 4 (324)

| PHYS. SECTORS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| FLBA NO. | Y | 100 | 101 | 102 | 103 | Y | Y | 104 | 105 | 106 | 107 | 108 | 109 | Y | Y | Y |
| LOG. SECTORS | 15 | 0 | 1 | 2 | 3 | 4 | 5 | 6 | 7 | 8 | 9 | 10 | 11 | 12 | 13 | 14 |
| NEW FLBA | Y | 100 | 101 | 102 | 103 | Y | Y | 104 | 105 | 106 | 107 | 108 | 99 | Y | Y | Y |
| NEW LOG. | 3 | 4 | 5 | 6 | 7 | 8 | 9 | 10 | 11 | 12 | 13 | 14 | 15 | 0 | 1 | 2 |

SKEW MID & BOTH LOGICAL ENDS                    SKEW - = 4

| PHYS. SECTORS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| FLBA NO. | Y | Y | Y | Y | 100 | 101 | 102 | Y | Y | Y | 103 | 104 | 105 | 106 | Y | Y |
| LOG. SECTORS | 15 | 0 | 1 | 2 | 3 | 4 | 5 | 6 | 7 | 8 | 9 | 10 | 11 | 12 | 13 | 14 |
| NEW FLBA | Y | Y | Y | Y | 100 | 101 | 102 | Y | Y | Y | 103 | 104 | 105 | 99 | Y | Y |
| NEW LOG. | 3 | 4 | 5 | 6 | 7 | 8 | 9 | 10 | 11 | 12 | 13 | 14 | 15 | 0 | 1 | 2 |

FIG. 8E

FIG. 9A — NO SKIPS, SKEW += 1 (330)

| PHYS. SECTORS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| FLBA NO. | 115 | 100 | 101 | 102 | 103 | 104 | 105 | 106 | 107 | 108 | 109 | 110 | 111 | 112 | 113 | 114 |
| LOG. SECTORS | 15 | 0 | 1 | 2 | 3 | 4 | 5 | 6 | 7 | 8 | 9 | 10 | 11 | 12 | 13 | 14 |
| NEW FLBA | 115 | 116 | 101 | 102 | 103 | 104 | 105 | 106 | 107 | 108 | 109 | 110 | 111 | 112 | 113 | 114 |
| NEW LOG. | 14 | 15 | 0 | 1 | 2 | 3 | 4 | 5 | 6 | 7 | 8 | 9 | 10 | 11 | 12 | 13 |

FIG. 9B — SKIPS MID LOGICAL TRACK, SKEW += 1 (334)

| PHYS. SECTORS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| FLBA NO. | 112 | 100 | 101 | 102 | 103 | Y | Y | 104 | Y | 105 | 106 | 107 | 108 | 109 | 110 | 111 |
| LOG. SECTORS | 15 | 0 | 1 | 2 | 3 | 4 | 5 | 6 | 7 | 8 | 9 | 10 | 11 | 12 | 13 | 14 |
| NEW FLBA | 112 | 113 | 101 | 102 | 103 | Y | Y | 104 | Y | 105 | 106 | 107 | 108 | 109 | 110 | 111 |
| NEW LOG. | 14 | 15 | 0 | 1 | 2 | 3 | 4 | 5 | 6 | 7 | 8 | 9 | 10 | 11 | 12 | 13 |

| PHYS. SECTORS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| FLBA NO. | 111 | Y | Y | 100 | 101 | 102 | 103 | Y | Y | 104 | 105 | 106 | 107 | 108 | 109 | 110 |
| LOG. SECTORS | 15 | 0 | 1 | 2 | 3 | 4 | 5 | 6 | 7 | 8 | 9 | 10 | 11 | 12 | 13 | 14 |
| NEW FLBA | 111 | Y | Y | 112 | 101 | 102 | 103 | Y | Y | 104 | 105 | 106 | 107 | 108 | 109 | 110 |
| NEW LOG. | 12 | 13 | 14 | 15 | 0 | 1 | 2 | 3 | 4 | 5 | 6 | 7 | 8 | 9 | 10 | 11 |

SKIPS MID & START OF LOGICAL TRACK   SKEW+ = 3

FIG. 9C

| PHYS. SECTORS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| FLBA NO. | Y | 100 | 101 | 102 | 103 | Y | Y | Y | 104 | 105 | 106 | 107 | 108 | Y | Y | Y |
| LOG. SECTORS | 15 | 0 | 1 | 2 | 3 | 4 | 5 | 6 | 7 | 8 | 9 | 10 | 11 | 12 | 13 | 14 |
| NEW FLBA | Y | 108 | 101 | 102 | 103 | Y | Y | Y | 104 | 105 | 106 | 107 | 108 | Y | Y | Y |
| NEW LOG. | 14 | 15 | 0 | 1 | 2 | 3 | 4 | 5 | 6 | 7 | 8 | 9 | 10 | 11 | 12 | 13 |

SKIPS MID & END OF LOGICAL TRACK   SKEW+ = 1

FIG. 9D

SKIPS MID & BOTH START & END OF LOGICAL TRACK    SKEW + = 4

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PHYS. SECTORS | | | | | | | | | | | | | | | | |
| FLBA NO. | Y | Y | Y | Y | 100 | 101 | Y | Y | Y | 102 | 103 | Y | 104 | 105 | Y | Y |
| LOG. SECTORS | 15 | 0 | 1 | 2 | 3 | 4 | 5 | 6 | 7 | 8 | 9 | 10 | 11 | 12 | 13 | 14 |
| NEW FLBA | Y | Y | Y | Y | 106 | 101 | Y | Y | Y | 102 | 103 | Y | 104 | 105 | Y | Y |
| NEW LOG. | 11 | 12 | 13 | 14 | 15 | 0 | 1 | 2 | 3 | 4 | 5 | 6 | 7 | 8 | 9 | 10 |

348
302 — PHYS. SECTORS
304 — FLBA NO.
306 — LOG. SECTORS
308 — NEW FLBA
310 — NEW LOG.

FIG. 9E

| CYLINDER | HEAD | SKEW DELTA |
|:---:|:---:|:---:|
| 100 | 7 | 1 |
| 101 | 2 | 3 |
| 101 | 3 | 1 |
| 101 | 8 | 0 |
| FFFF | FF | 0 |

| |
|---|
| CURRENT ZONE TABLE ENTRY |
| CURRENT FLBA |
| NEXT BOUNDARY FLBA |
| NON-SKIP SECTORS UNTIL NEXT BOUNDARY FLBA |
| BEGINNING VT POINTER |
| CURRENT VT POINTER |
| ENDING VT POINTER |
| CURRENT SPINDLE SYNCHRONIZATION ZONE |
| CURRENT RAW SKEW |
| CURRENT SYNC SKEW |
| REASSIGN SKEW — 422 |
| CURRENT TOTAL SKEW |
| CURRENT CYLINDER |
| CURRENT SECTOR |
| SECTORS LEFT TIL REAL BOUNDARY |
| CURRENT HEAD |
| CYLINDERS LEFT IN SSZ |
| BUFFER ADDRESS OF REASSIGN SKEW — 424 |
| NEXT CYLINDER WITH REASSIGN SKEW DELTA — 426 |
| NEXT HEAD WITH REASSIGN SKEW DELTA — 428 |
| |
| CURRENT STATE — 430 |
| STARTING SECTOR — 432 |
| BLOCKS TO TRANSFER — 434 |
| NUMBER OF SKIP SECTORS ON TRACK — 436 |
| MAX NUMBER OF SKIP SECTORS PER TRACK — 438 |
| TABLE OF SKIP SECTORS — 440 |

FIG. 12

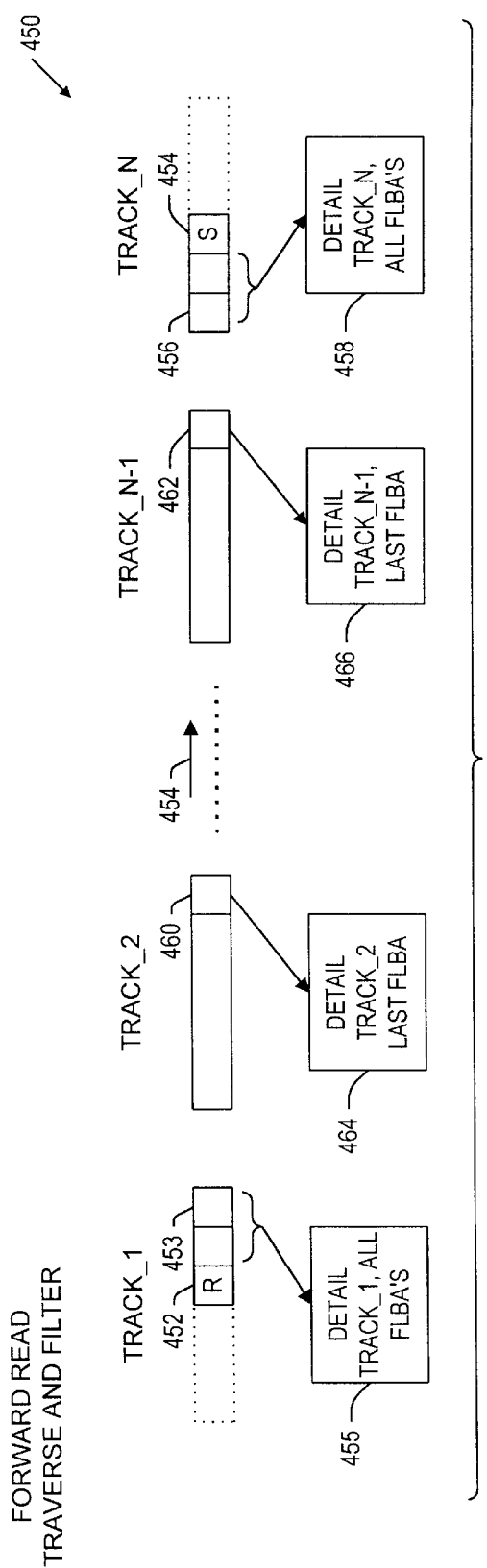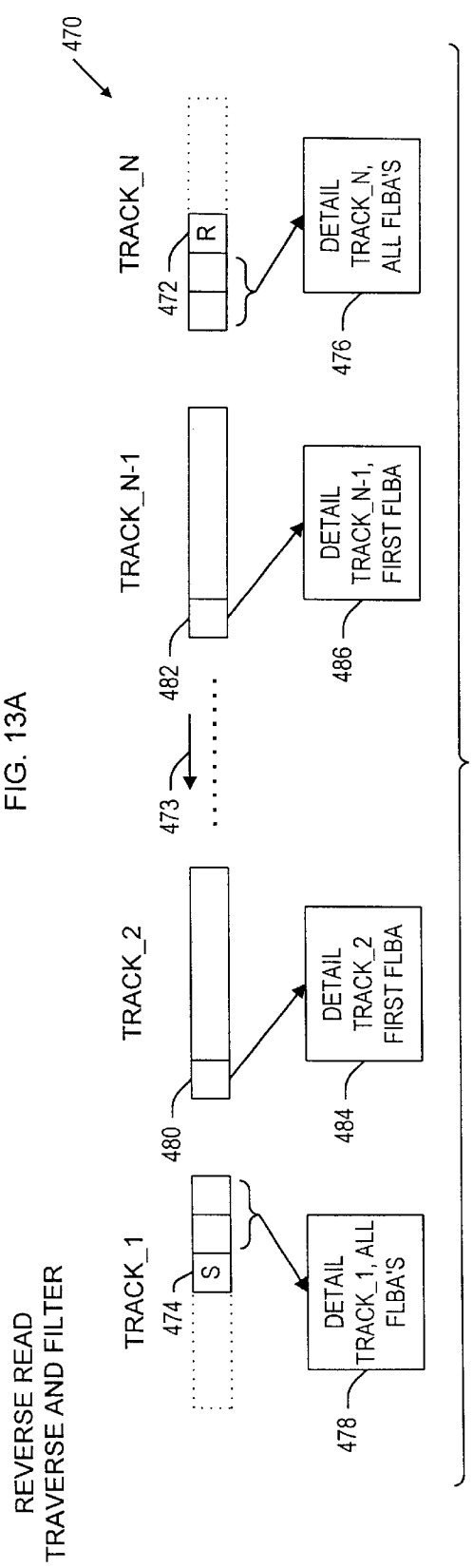

FAST TRACK REASSIGN IN A ROTATING STORAGE MEDIA

BACKGROUND OF THE INVENTION

1. Field of the Invention

The present invention relates to the control of storage systems for digital computers. More particularly, the present invention relates to a method and apparatus for reassigning data sectors stored in a rotating media storage system.

2. Description of the Prior Art

Disk drive systems typically include: a disk having a thin magnetic coating upon which user data and position information is stored in the form of flux transitions disposed in a series of concentric tracks; a spindle assembly having a spindle motor for supporting and rotating the disk; a read/write head for detecting the flux transitions in the magnetic material as the disk is rotated relative to the head, and for generating an analog read-back signal carrying data and position information; a head-arm assembly for supporting and moving the head radially over the surface of the disk; an actuator assembly for driving the head-arm assembly in response to an actuator command signal; a servo controller providing the actuator command signal which is used to position the head relative to the tracks of the disk; a read/write electronics unit coupled to receive the read-back signal from the head and operative to provide servo information to the servo controller; an interface unit for communicating with a host system; and a formatter unit for receiving a list of logical address values indicating requested data sectors from the interface unit and converting the logical address values into zone, cylinder, head, and sector values (ZCHS values) which uniquely identify the location of the requested data sectors. The ZCHS values are used by the servo controller to position the head over an appropriate data sector on an appropriate track or cylinder. A disk drive system performs operations including: formatting the disk for storing data in a format supported by the system and the disk; writing data received from the host to the disk; and reading data from the disk and transmitting it to the host.

In a sector servo disk drive system, the disk surface includes tracks which are divided into radial sectors each including: a servo region for storing servo fields for carrying servo information which is pre-written on the disk during manufacturing; and a data region for storing data fields. The servo information is used by the controller to determine the location of a servo field and track for positioning of the head relative to a particular track during read and write operations. In a dedicated servo system having multiple disks, the entire surface of one side of one disk is pre-recorded with servo track information and the position of a servo head relative to the dedicated disk surface is used to indicate the position of multiple data read/write heads relative to their respective disk surfaces. In a disk drive having multiple heads and multiple disks, a set of tracks disposed at the same radius on all surfaces is referred to as a cylinder.

Typically, each data sector includes an ID field, a GAP field, a DATA field and a PAD field. The DATA field includes: a DATA sub-field; and an error correction code (ECC) sub-field used to detect and correct soft or hard errors on the media within the capability of the code for the purpose of avoiding the transfer of erroneous data to and from the host. As further explained below, some sector servo system formats do not use an ID field, but rather use a header sub-field within the DATA field. ID fields provide unique identification tags for each sector in a track. Each ID field comprises sub-fields including an ID sub-field and a CRC sub-field having error detection bytes used to detect errors in the ID field. The ID sub-field typically includes a cylinder high byte, a cylinder low byte, a sector number byte, a head number byte, and a plurality of defect management bytes, further described below.

In typical ID_Less formats, the ID field is replaced by a header sub-field within the DATA field, thus combining the identification data and the DATA field into one field and reducing the number of bits necessary for each sector. The CRC field associated with the header sub-field can be decreased or eliminated, thereby further reducing the overhead of the system and eliminating the hardware which generates the CRC field. In ID_Less formats, all information in the sector header may be predetermined by reading a small number of other sector headers on the track. An example of a No-ID™ format is taught by Best et al. in U.S. Pat. No. 5,500,848, entitled "SECTOR SERVO DATA RECORDING DISK HAVING DATA REGIONS WITHOUT ID FIELDS" which is incorporated herein by reference. The No-ID™ format provides increased data storage capacity by increasing recording density.

Another commonly used technique for increasing the data storage capacity of a disk is the method of zone bit recording (ZBR) in which the disk is divided into multiple zones in order to take advantage of the higher storage potential of the outer tracks without exceeding the allowable density on the inner tracks. The tracks are grouped into zones such that all the tracks in one zone are adjacent to each other. The data rate at which data is written to or read from the disk is constant for all tracks within a zone and probably different for each zone.

During seek operations, as the read/write head moves between zones, the disk is continuously rotating which may cause the read/write head to cross over one or more servo fields as it travels from one track or zone to another track or zone. As the read/write head changes tracks between different zones, the number of sectors between servo marks changes because of the change in bit density between zones. While the angular position of the head is always known, the angular position must be translated after a zone change into a known position on the track.

In disk drive systems using ID fields, the ID fields are written onto the disk during the format operation, and include defect management information which indicates whether the corresponding data sector is a spare sector or a bad data sector. At the end of the format operation, all information regarding good sectors, bad sectors, and spare sectors is known to the disk drive, and can be queried by scanning the entire set of sector IDs written on the disk. In disk drive systems using a No-ID™ format, a defect map is used to provide defect information.

Media defects in the magnetic recording layer of a disk may result in portions of the layer becoming unacceptable for use in recording the magnetic transitions. As recording densities increase, both in terms of radial tracks per inch and linear density along a track, the occurrence of media defects increases. Defects may be introduced during the manufacturing process which prevent data from being stored in or retrieved from the sector are detected after the manufacturing process and stored in a primary defect list, or "P-list". During a format operation, the P-list is stored directly on the disk in a reserved space of the disk. Additional defective sectors, known as secondary or "grown" defects may be detected after the P-list has been compiled. A list of grown defects is maintained and stored in a grown defect list, or "G-list", which is also stored in a reserved space. A table derived from the P-list and G-list at format time is read from the disk and stored in a RAM upon power up of the system, and the controller uses information derived from the P-list and G-list to manage defects and avoid writing data to defective sectors.

FIG. 1 shows a block diagram at 10 illustrating a data sector format conversion system of a prior art disk drive system including zone bit recording and adaptive skewing features. The data sector format conversion system 10 includes: an LBA to PBA conversion unit 12 for receiving logical block addresses (LBA's) via a bus 14, and for providing corresponding physical block addresses (PBA's) to a bus 16; a defect mapping unit 18 referred to by the LBA to PBA conversion unit 12 via a bus 20; a PBA to ZCHS conversion unit 22 for receiving PBA's from unit 12 via bus 16, and for providing corresponding ZCHS values to a bus 24; a zone conversion unit 26 referred to by the PBA to ZCHS conversion unit 22 via a bus 28; a skew machine 30 for receiving ZCHS values from the PBA to ZCHS conversion unit via bus 24, and for providing corresponding skewed ZCHS values to a bus 32; and a synchronization skew unit 34 referred to by the skew machine 30 via a bus 36.

Descriptions of exemplary implementations of the LBA to PBA conversion unit 12 and defect mapping unit 18 for a No-ID™ format are provided in the aforementioned Best et al. patent. Another example of a defect management method for use with a No-ID™ format is taught by Dobbek in United Kingdom Patent Application Number 9425483.6, entitled "A SYSTEM AND METHOD FOR SKIP-SECTOR MAPPING IN A DATA RECORDING DISK DRIVE" which is incorporated herein by reference. This system includes a defect map which is implemented by: a virtual track table (VT table) including entries representing the mostly redundant higher order bits of logical block addresses; and a virtual sector table (VS table) including entries representing the lower order bits of logical block addresses.

The zone conversion unit 26 is used in disk drives implementing zone bit recording and typically uses a zone table including a zone entry for each zone. Each of the zone entries includes: a starting PBA for the corresponding zone; the number of data sectors per group, where a group is some fixed unit such as a track or cylinder; the number of data sectors per track; and the starting cylinder of the group. In such an implementation, a search for given PBA simply requires locating the appropriate zone entry in the table. Thus, if the group is defined as a cylinder, the zone table can easily be used to determine a PBA offset, a track offset, a head, a sector, and a cylinder. Alternatively, if the group is defined as a track, the table can easily be used to determine PBA offset, a track, a sector, a cylinder, and a head. Thus, regardless of the group definition, the PBA leads readily to a physical disk location. Once the disk drive completes the required seek operation to the cylinder and head identified, the drive formatter scans for either the desired LBA or the desired sector by examining the ID field of each data sector as it passes under the head, or calculates the actual location of the desired LBA (sector) using No-ID techniques. When the appropriate data sector is found, the data is transferred and the operation is complete.

The skew machine 30 and synchronization skew unit 34 provide appropriate skewing of the sector information provided by conversion unit 22. In order to minimize the latency when performing sequential operations across track boundaries, cylinder boundaries, and zone boundaries, LBA's must be staggered by some number of sectors. A sequential operation across track boundaries, for purposes of the present application, may arise due to a head switch, including switching from one head to another in a cylinder, or a switch across track boundaries within a single disk. The number of sectors by which a sequential operation is staggered is called skew factor, or skew value. A skew factor in a multiple disk array storage system may include both a raw skew factor and a synchronization skew factor. Components of raw skew include: a track skew factor accounting for the time required to physically switch heads; a cylinder skew factor accounting for the time required to physically switch cylinders; and a zone skew factor accounting for the time required to change zone parameters and become ready to access an LBA in the new zone and is measured in data sectors.

Synchronization skew is used in multiple disk drive array storage device systems (DASD systems) to shift sector locations in response to excessive defects occurring in a synchronization zone on a disk thereby synchronizing the phase of the disks in the system without consuming additional disk storage capacity. In a DASD system, a number of different spindles must be synchronized, and it is often desirable to synchronize the rotation of all disk drives in the system to one master index. However, synchronization becomes very difficult when one of the spindles has a large number of defects because when a defect is encountered on one of the disks, all data on the disks with defects will be shifted in time relative to a disk without defects. Thus, the data on the defective disk will be out of phase by a number of sectors, and the spindle with the defects tends to lag more and more behind the other spindles.

To solve this problem, an adaptive synchronization skew method is taught by Dobbek in U.S. Pat. No. 5,586,606, entitled "METHOD AND APPARATUS FOR MAXIMIZING EFFECTIVE DISK CAPACITY USING ADAPTIVE SKEWING" which is incorporated herein by reference. In accordance with this adaptive synchronization skew method, each track is arranged into synchronization zones, the adaptive synchronization skew comprising an excess transition time period associated with each synchronization zone for synchronizing the phase and speed of rotation of the disk storage devices. An excess time period comprises raw and synchronization skew, wherein the synchronization skew is used to shift sector locations in response to excessive defects occurring in the synchronization zone on the disk thereby synchronizing the phase of the disks in the system without consuming additional disk storage capacity.

Defect Management

Many different defect management schemes are used in the prior art. For example, in a linear replacement defect management scheme, defective sectors are flagged and mapped to a good sector somewhere else on the disk causing the system to jump from the defective sector to the good sector and then back to the sector following the defective sector in order to read or write the data on the disk in a consecutive order. This mapping technique adds considerable latency to the system and degrades its performance because of the required jumps from the defective sectors to the mapped substituting good sector and back. Each sector on the track is identified consecutively by a physical address or physical sector number, representing the actual location of the sector on the track. A logical sector number is used by the system controller to read data from and write data to the disk drive. If a first track includes more defective sectors than spare sectors, each defective sector which cannot be mapped to a spare sector of the first track must be mapped to a spare sector of another corresponding track. In this case, the system must travel to the other corresponding track in order to read the data from or write the data to the sector which is substituting for the defective sector of the first track, and then travel back to the first track in order to read or write further information in a consecutive order. An associated mapping value accompanies each defective sector which cannot be mapped to a spare sector on the same track to inform the system where the substituting sector is located on the disk. The associated mapping value can be found in a pointer within the ID field of the defective sector or can be found in a defect table which lists all of the defective sectors and their associated substituting sectors. The disadvantage of the method of linear replacement is that it requires extra seeks to be performed by the system if the system is to read or write the data in a consecutive order corresponding to the logical sector numbers An improvement over the linear replacement technique is the method of sector slipping which also uses spare sectors assigned to each track or cylinder to avoid the defective sectors, but does not require as many seeks to be performed by the system. Each sector on a track is identified consecutively by a physical address or physical sector number, representing the actual location of the sector on the track. The sectors are numbered from zero to N−1, consecutively from the INDEX mark, where N is the number of sectors on the track. The sectors on a track are also identified by a logical sector number corresponding to their position within the sequence of data stored on the track. The logical sector number is used by the controller to read data from and write data to the disk drive. Not every sector will be assigned a logical sector number. A typical system employing sector slipping will include spare sectors at the end of each track. In a sector slipping scheme the defective sector is mapped to the next good sector on the track until all spare sectors are used. During formatting of the disk drive, logical sectors,are assigned consecutively from a first sector on the track to the last sector, slipping defective sectors until all spare sectors on the track are used.

When the number of defects on a track is greater than the number of spares assigned to that track, the defective sectors are still slipped. But as soon as the number of defective sectors exceeds the number of spares on the track, the remainder of the defective sectors are not slipped, but are mapped to a sector on another track or somewhere else on the disk using the linear replacement method as described above, or cylinder slipping method from one track to the next.

The method of sector slipping maintains the logical sectors in a consecutive order allowing the system to read or write the data in a consecutive order without extra seeks. Extra seeks are required when the number of defective sectors on the track or segment exceed the number of spare sectors assigned to the track or segment and the system must travel to another track or segment to read or write the data from a substituting spare sector and then back to the original track.

FIGS. 2A and 2B show block diagrams at 40 and 42 each depicting a plurality of sequential tracks 44 of a file, each of the tracks including a plurality of sectors 45. FIG. 2A depicts a prior art in-line reassign operation implemented in a forward direction for a reassign sector 48 shifted in a forward direction toward a closest spare sector 50. FIG. 2B depicts a prior art in-line reassign operation implemented in a reverse direction for a reassign sector 52 shifted in a reverse direction toward a closest spare sector 54.

A reassign operation may be initiated in response to a request by a customer via a command, or may be automatically initiated in accordance with a data recovery procedure if the drive is so authorized by the customer. A typical prior art reassign includes the initial steps of: finding a closest spare sector which may be disposed at a location in either a forward or a reverse direction from the reassign sector, and which is closest to the reassign sector; and scanning all of the sectors disposed between the reassign sector and the closest spare to determine whether an ECC exposure indicates a defect between the reassign sector and the closest spare. If it is determined that there are no ECC exposures indicating a defect between the reassign sector and the closest spare, the controller: updates the defect tables to indicate the corresponding reassign; updates a check point value indicative of a number of sectors, between the reassign sector and closest spare, which have been copied to a buffer; and sets to zero a sectors-moved value which is indicative of a number of sectors between the reassign sector and closest spare which have been copied from the buffer to corresponding slipped sector locations.

If it is determined that there is one or more ECC exposures indicating a defect between the reassign sector and the closest spare, the controller scans all of the sectors disposed between the reassign sector and the next closest opposite direction spare to determine whether an ECC exposure indicates a defect between the reassign sector and the next closest opposite direction spare. If it is determined that there are no ECC exposures indicating a defect between the reassign sector and the next closest opposite direction spare, the controller executes the same steps outlined above for the next closest opposite direction spare. If it is determined that there is one or more ECC exposures indicating a defect between the reassign sector and the next closest opposite direction spare, the controller indicates an error or nested reassign. A nested reassign is one where defects encountered during a reassign are also reassigned. Nested reassign processes are complicated and dangerous.

After finding a closest spare sector, updating the defect tables and check point value, and setting the sectors-moved value to zero, the controller begins moving sectors appropriately. In accordance with a sector moving sequence of the reassign operation, the controller slips, or shifts, each of the sectors between the reassign sector and the closest spare sector by one sector location in the direction of the closest spare by reading the reassign sector and each of the intermediate data sectors between the reassign sector and the closest spare sector, and then writing back each of the intermediate data sectors shifted by one. If the reassign sector is a defective sector, the corresponding data sector is corrected using error correction codes (ECC). The number of intermediate sectors may be very large because the stream of intermediate sectors may span many track boundaries. Because the number of intermediate sectors may exceed the capacity of the buffer used to read the reassign sector and intermediate sectors, the intermediate sectors must be moved piece-wise which introduces a potential problem of losing data in the event of a power failure.

To avoid the potential problem of losing data, prior art reassign operations include the steps of: seeking to the customer data area; reading a current portion (e.g., a plurality of N of the intermediate tracks) of the sectors to be shifted into a buffer; seeking to a reserved storage area of the file; writing the current portion of the sectors from the buffer to the reserved storage area; writing an updated check point value to the reserved storage area; reading a next portion of the sectors from the reserved area into the buffer; seeking back to the customer data area; and writing the data sectors from the reserved area to the corresponding appropriate sector locations (shifted forward or backward by one). Reassign operations performed according to the above described prior art method are very time consuming due to the very large average numbers of sectors between the reassign sectors and corresponding spare sectors. The number of sectors between a reassign sector and corresponding spare sector increases as spare sectors are used. Each sector may require several seconds to be reassigned.

FIG. 3 shows a prior art track detail object at 60 which includes information used for implementing a transfer of a track or a portion of a track. This information is loaded into hardware to implement the transfer. The prior art track detail object 60 includes: a current zone table field, a current FLBA field, a next boundary FLBA field, a field for storing a value indicating the number of non-skip sectors until the next boundary FLBA, a beginning VT pointer field, a current VT pointer field, an ending VT pointer field, a current spindle synchronization zone field, a field for storing a current raw skew value, a field for storing a current synchronization skew value, a field for storing a current total skew value, a field for storing a current cylinder value, a field for storing a current sector value, a field for storing a value indicating the number of sectors until a real boundary, a field for storing a current head value, and a field for storing a value indicating the number of cylinders left in a spindle sync zone.

The prior art track detail object also includes: a current state field; a starting sector field for storing a starting sector value; a field for storing a value indicative of the number of blocks to transfer; a skip count field for carrying a value indicative of the number of skips sectors on the corresponding track; and a field for carrying a value indicative of a maximum number of skips sectors per track.

Conventionally, a track detail object is generated for each track upon transfer of the data, or a portion of the data, stored in the track. ZCHS values are generated for the starting sector of the transfer. The length of the data transfer, which may span several tracks, is also received from the host. The track detail object is generated based on ZCHS values, defect information, and state information. Initially, the sector format conversion system 10 (FIG. 1) receives a logical block address from the host system, and the LBA to PBA conversion unit 12 (FIG. 1) determines a corresponding physical block address, sets pointers in the defects/spares tables, determines a next boundary LBA, and the distance to the next boundary LBA. In a detail state sub-process, the PBA to ZCHS conversion unit 12 determines corresponding ZCHS values based on the physical block address referring to the zone conversion unit 26 (FIG. 1). A map track sub-process is executed to build a track image based on the starting sector of the transfer, the number of sectors to be transferred, skip locations which will be dropped in the transfer, and state information required by a state machine (not shown) building the track details. A next track sub-process advances the physical state to the next head/track.

After the track detail object is generated, front end transfer hardware is armed, in accordance with a pipeline type operation, and the data is transferred. The front end transfer hardware includes a starting sector register for storing a starting sector value; a skew register for storing a skew value; a length-of-transfer register for storing a value indicating the total number of sectors to be transferred; and a first-in-first-out buffer (FIFO) for storing the skips information derived from the VT and VS tables of the defect mapping unit 12 (FIG. 1), which include the locations of defective sectors and spare sectors.

The time required to transfer a single track is approximately equal to the sum of the rotational period (or revolution time) of the disk and the track skew time associated with the track to be transferred. The time required to transfer a file may be expressed according to Relationship (1), below;

$$(\text{Total No. of tracks}*\text{Revolution time})+(\text{Total Number of Tracks}-1)*\text{Skew time} \qquad (1)$$

While reassignment is a very time consuming process, the associated advantage of increasing throughput by eliminating the need to seek away to retrieve reassigned data remains very desirable. What is needed is a system and method for reassigning sectors wherein the time required to implement the reassignment is reduced. What is also needed is a system and method for reassigning sectors wherein the amount of data which must be moved, or transferred, is reduced so that a smaller buffer is required. What is further needed is a system and method for reassigning sectors wherein the chance of detrimentally affecting the integrity of stored data is reduced.

SUMMARY OF THE INVENTION

It is an object of the present invention to provide a system and method for reassigning sectors wherein: the time required to implement the reassignment is reduced; the amount of data which must be moved, or transferred, is reduced so that a smaller buffer is required; and the chance of detrimentally affecting the integrity of stored data is reduced.

Briefly, a presently preferred embodiment of the present invention includes a reassign process in a disk drive system including a plurality of tracks for storing data, each of the tracks being divided into a plurality, of sectors, each sector having a corresponding logical address value associated therewith. Each track has a corresponding skew associated therewith and having a nominal skew value providing adequate time for sequential access of the corresponding track from a sequentially preceding track. The reassign process is operative to reassign data sectors stored in a reassign span including a first partial track having a reassign sector, a second partial track having a spare sector corresponding with the reassign sector, and at least one intermediate track disposed between the first and second partial tracks. The reassign process includes the step of adjusting the nominal skew value of at least one of the intermediate tracks by a corresponding skew delta adjustment value so that the logical address values associated with the sectors of the intermediate track are transposed thereby effectively shifting data stored in selected sectors of the intermediate track in a direction of the spare sector relative to the reassign sector.

If the reassign sector sequentially precedes the corresponding spare sector, the step of adjusting the nominal skew value includes decreasing the nominal skew value by the corresponding skew delta adjustment value. In this forward direction reassign case, the skew delta adjustment value is determined by determining the number of sectors between a leading edge sector of the intermediate track and a first trailing edge non-skip sector of the intermediate track. Also, for a forward reassign, data is read from the first trailing edge non-skip sector of the intermediate track, and written to a selected sector of a succeeding track. In the preferred embodiment, the succeeding track is a succeeding intermediate track which is skewed by the corresponding skew delta adjustment value, and the selected sector of the succeeding intermediate track is a first trailing edge non-skip sector of the succeeding intermediate track.

If the spare sector sequentially precedes the corresponding reassign sector, the step of adjusting the nominal skew value includes increasing the nominal skew value by the corresponding skew delta adjustment value. In this reverse direction reassign case, the skew delta adjustment value is determined by determining the number of sectors between a trailing edge sector of the intermediate track and a first non-skip leading edge sector of the intermediate track. Also, for a reverse reassign, data is read from the first non-skip leading edge sector of the intermediate track, and written to a selected sector of a preceding track. In the preferred embodiment, the preceding track is a preceding intermediate track which is skewed by the corresponding skew delta adjustment value, and the selected sector is a first trailing edge non-skip sector of the preceding intermediate track.

If the reassign sector sequentially precedes the corresponding spare sector, the step of reading data from the first trailing edge non-skip sector of the intermediate track includes: reading a track detail object associated with the intermediate track from a memory storage device of the disk drive system; post processing the track detail object so that it specifies a transfer of only the first trailing edge non-skip sector of the intermediate track; storing the track detail object in a track detail queue in a memory storage device of the disk drive system; setting a fast track feed mode enabling streaming of the track detail object from the track detail queue; and reading the data into a data buffer of the disk drive system by transferring the data as specified by the track detail object.

If the spare sector sequentially precedes the corresponding reassign sector, the step of reading data from the first non-skip leading edge sector of the intermediate track includes: reading a track detail object associated with the intermediate track from a memory storage device of the disk drive system; post processing the track detail object so that it specifies a transfer of only the first leading edge non-skip sector of the intermediate track; storing the track detail object in a track detail queue in a memory storage device of the disk drive system; setting a fast track feed mode enabling streaming of the track detail object from the track detail queue; and reading the data into a data buffer of the disk drive system by transferring the data as specified by the track detail object. The foregoing and other objects, features, and advantages of the represent invention will be apparent from the following detailed description of the preferred embodiment which makes reference to the several figures of the drawing.

IN THE DRAWINGS

FIG. 3 is a block diagram illustrating a track detail object including information used for implementing a transfer of a track, or a portion of a track, in accordance with the prior art;

Figure 6:
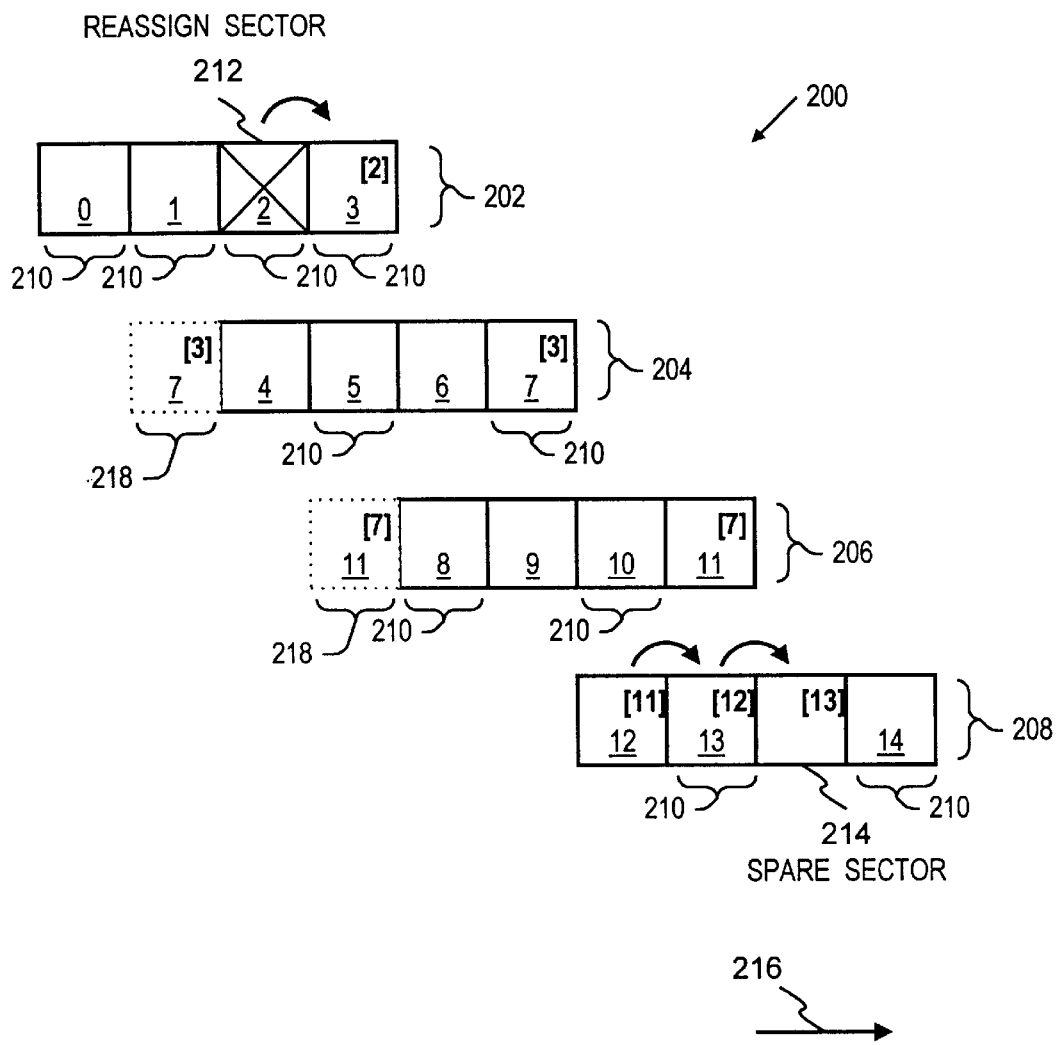
Figure 7:
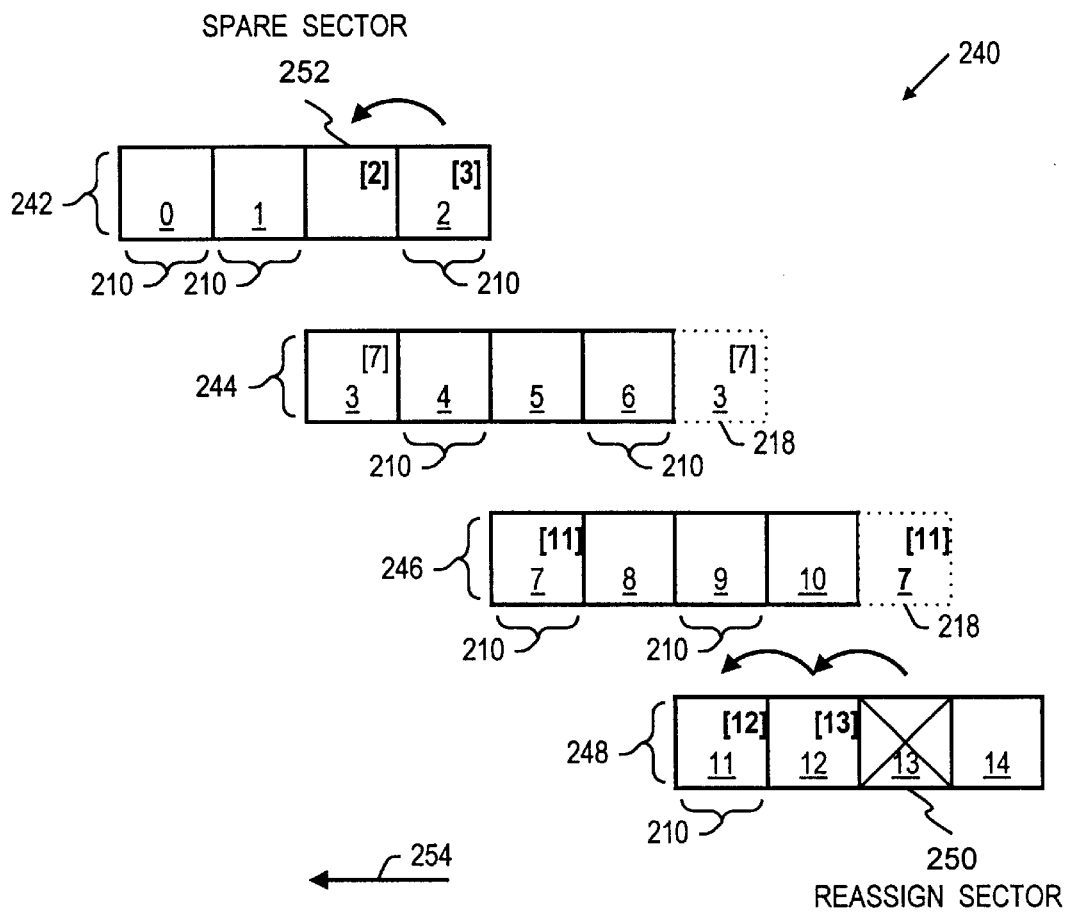
Figure 10A:
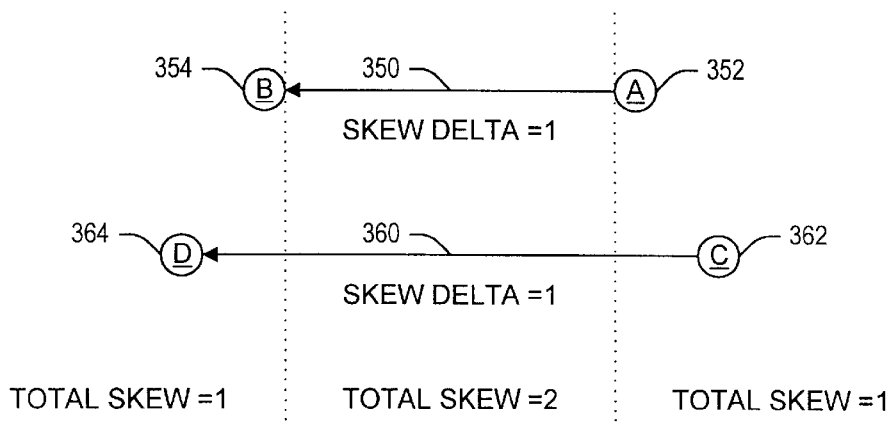
Figure 10B:
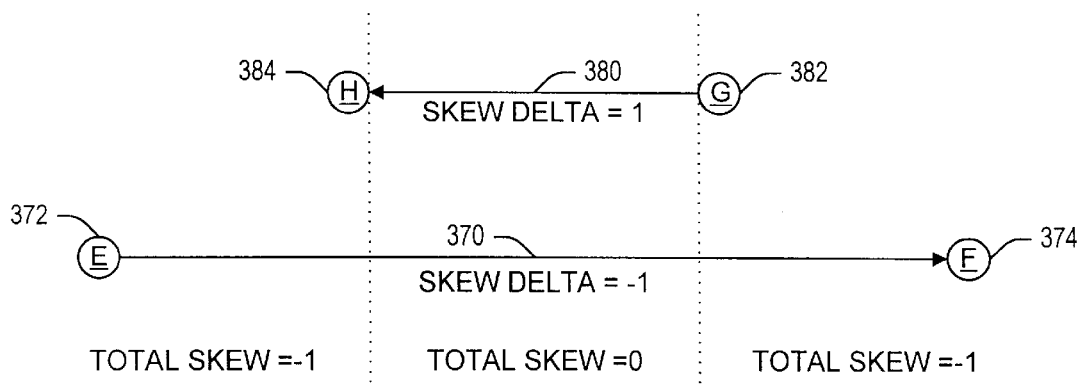
Figure 14A:
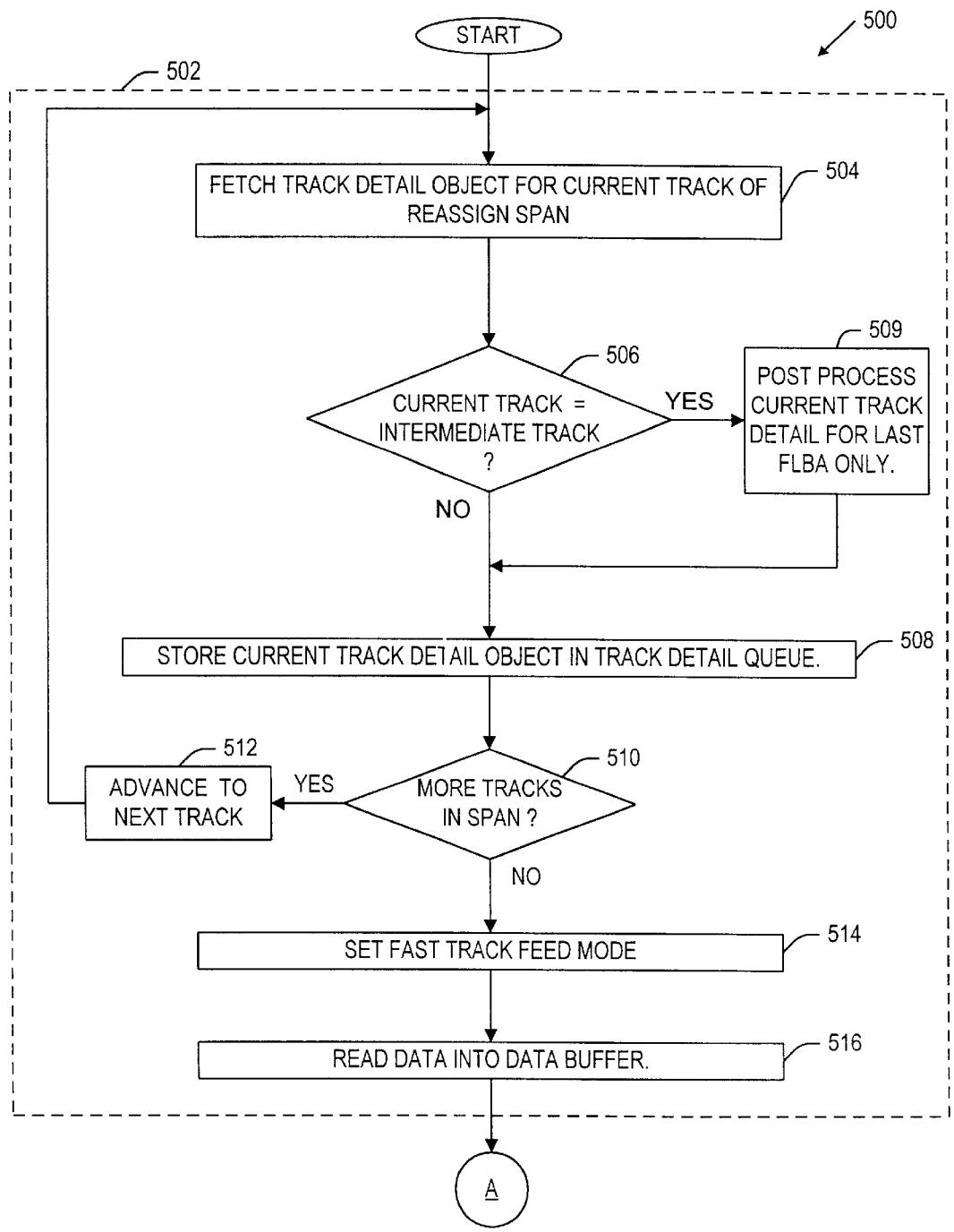
Figure 14B:
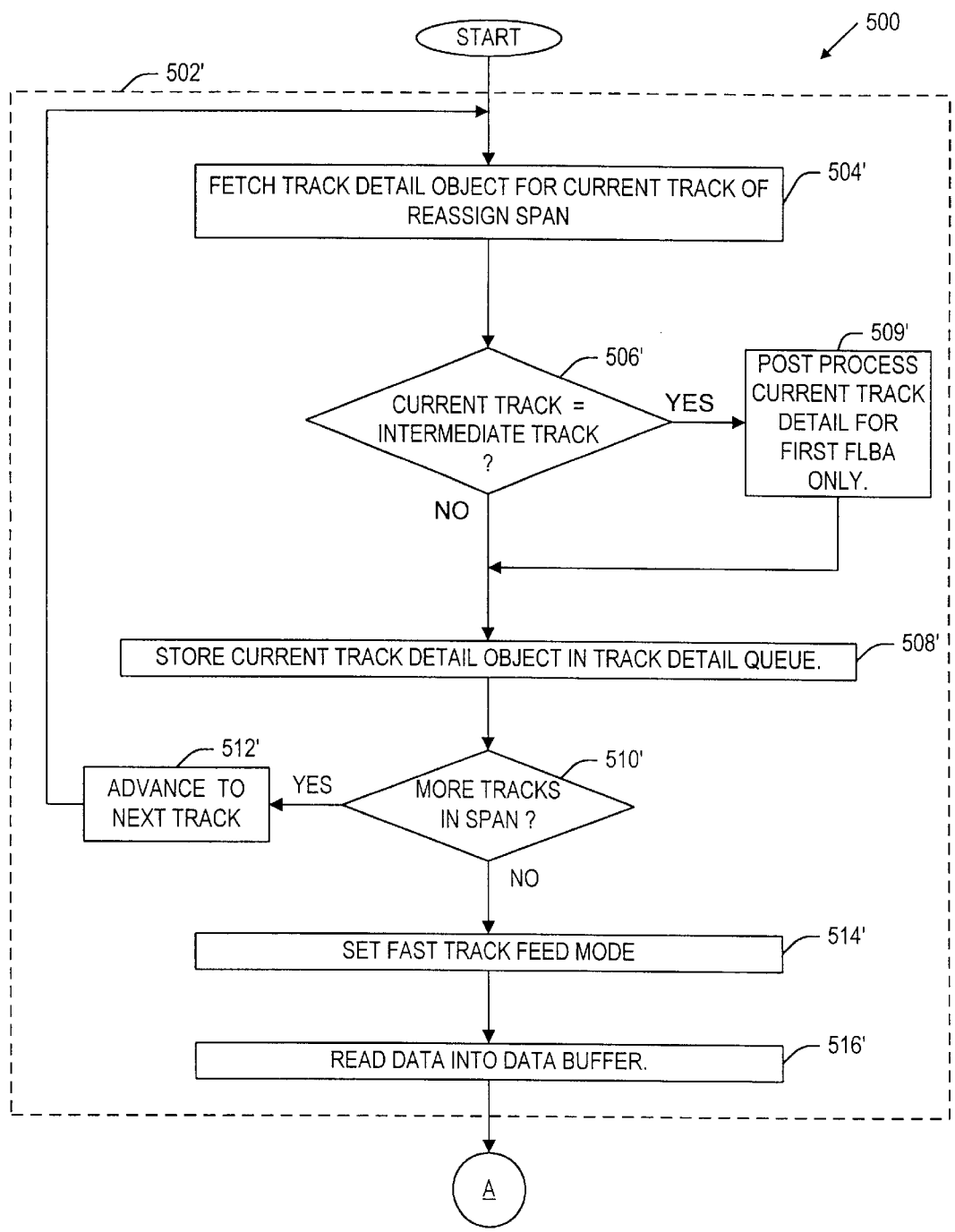
Figure 15A:
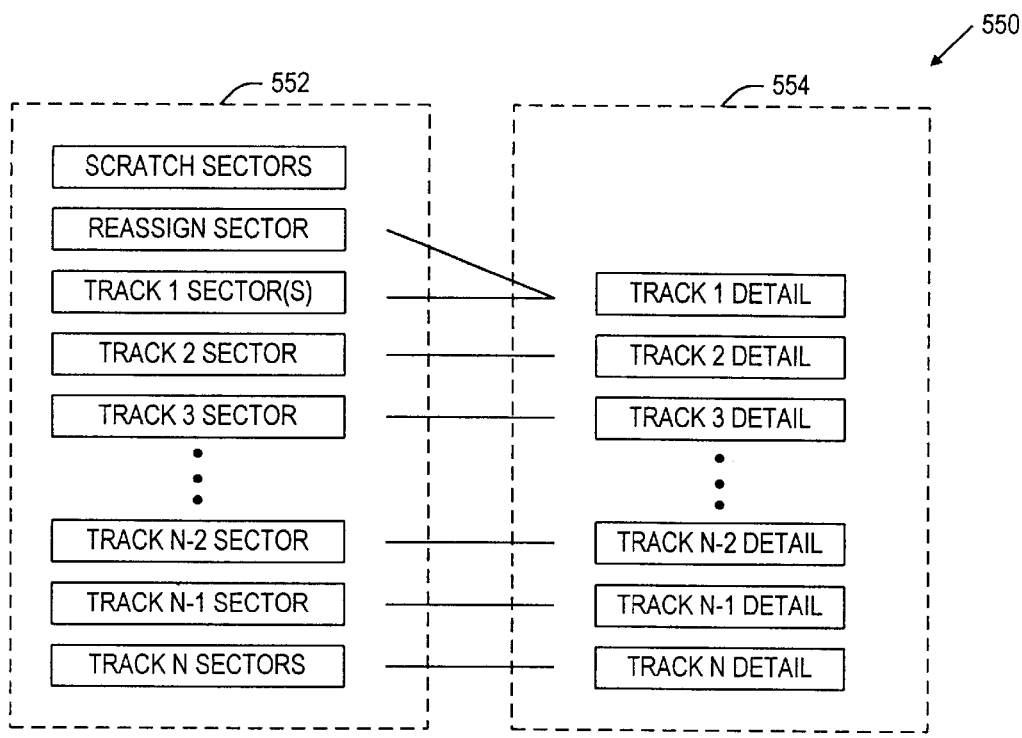
Figure 15B:
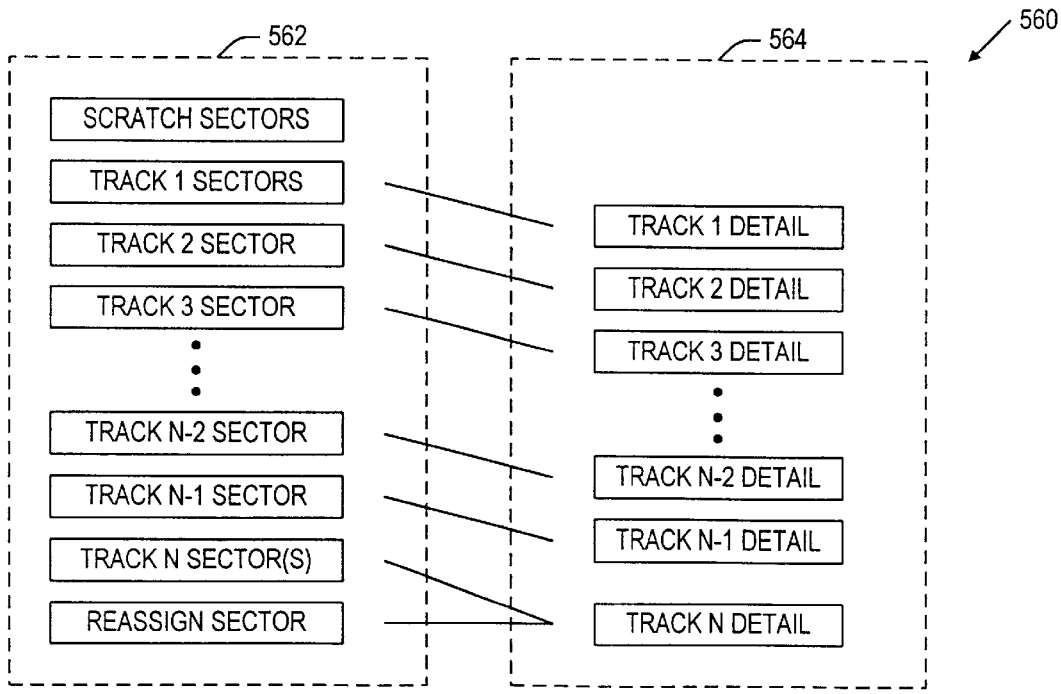
Figure 16:
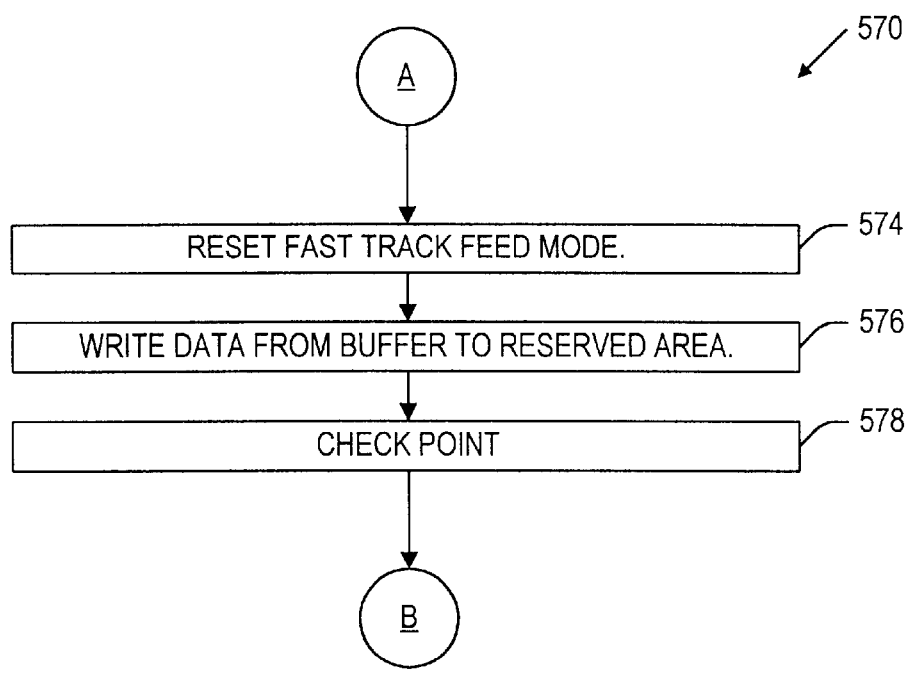
Figure 17A:
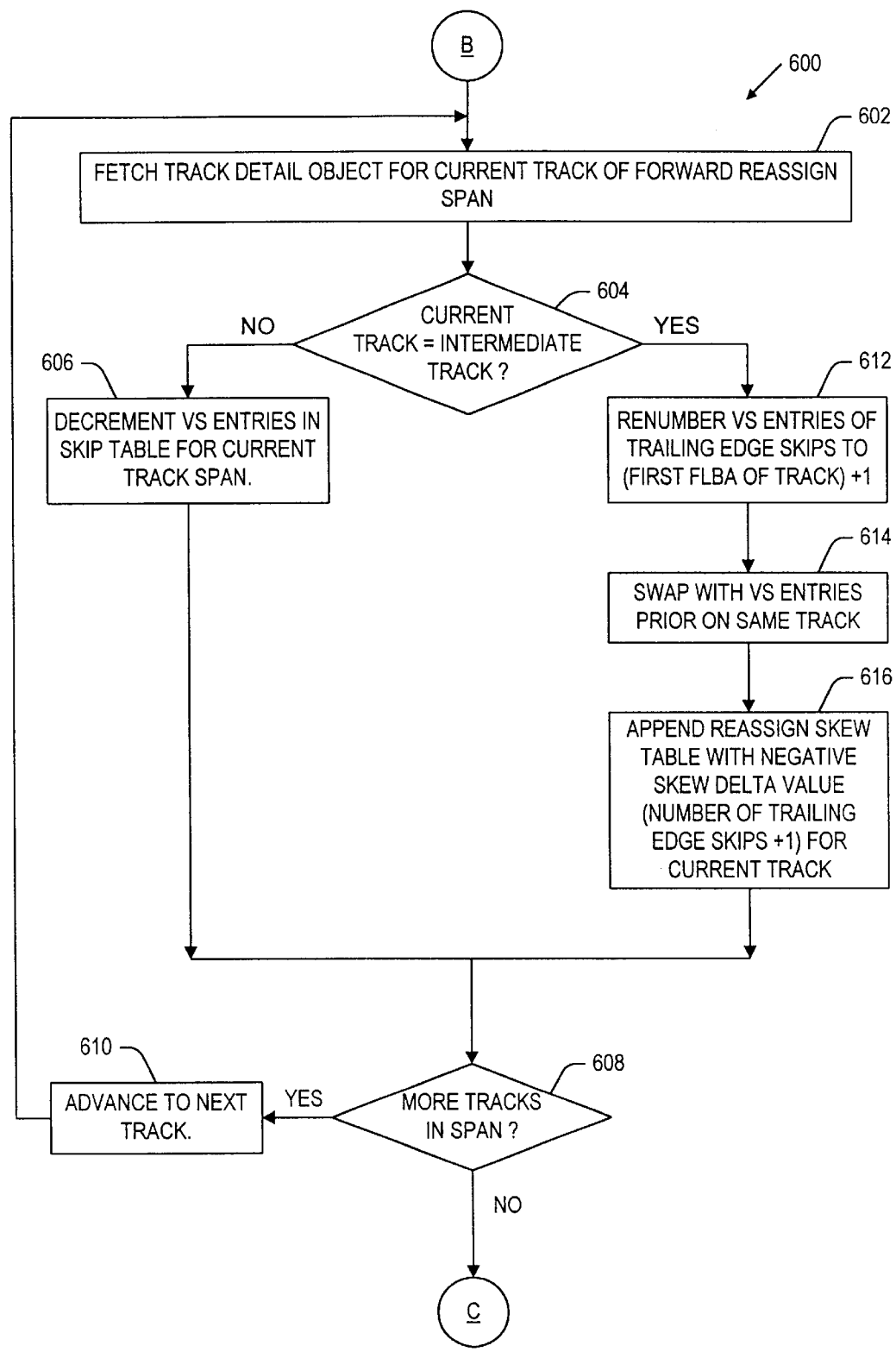
Figure 17B:
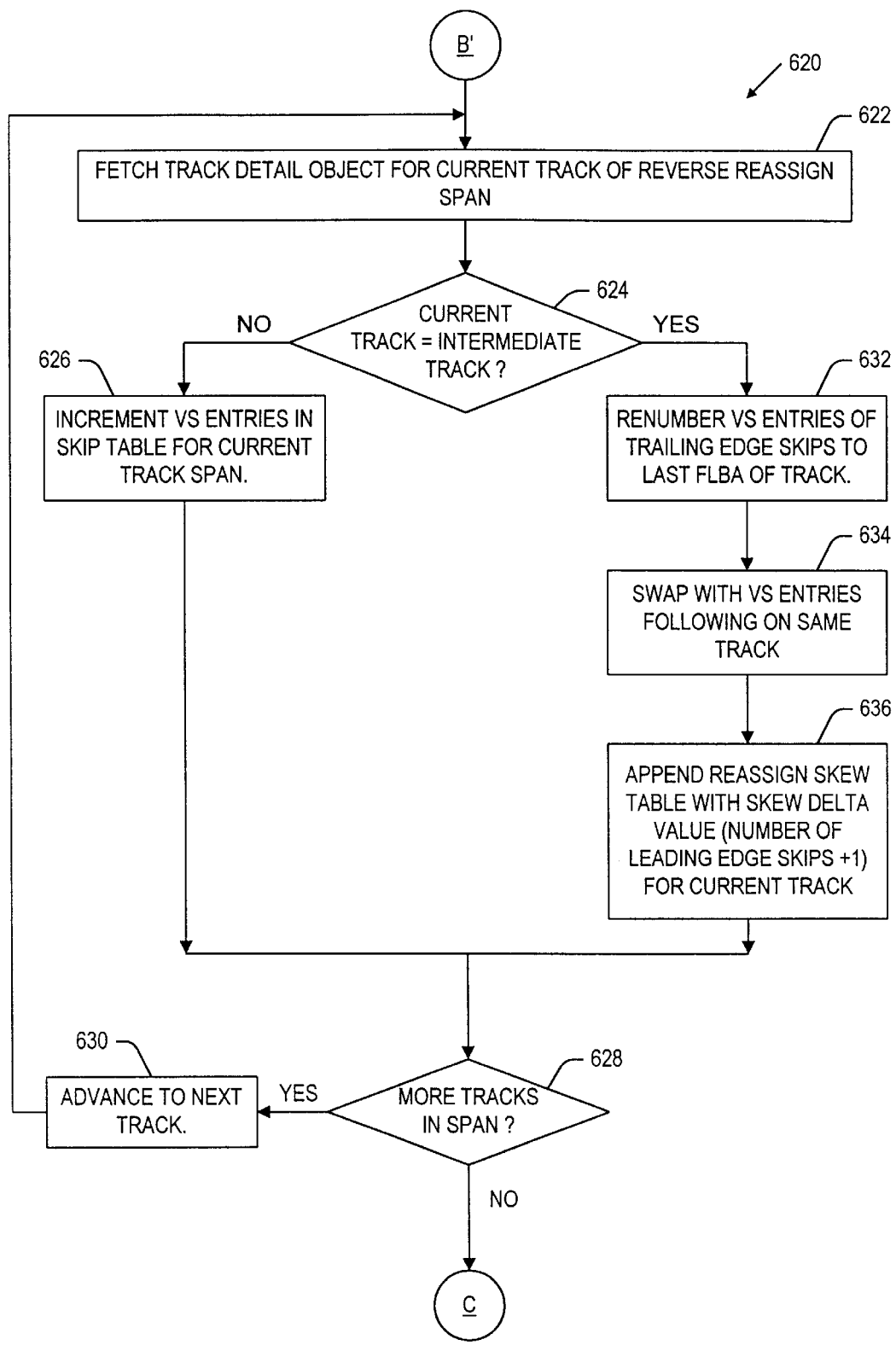
Figure 18A:
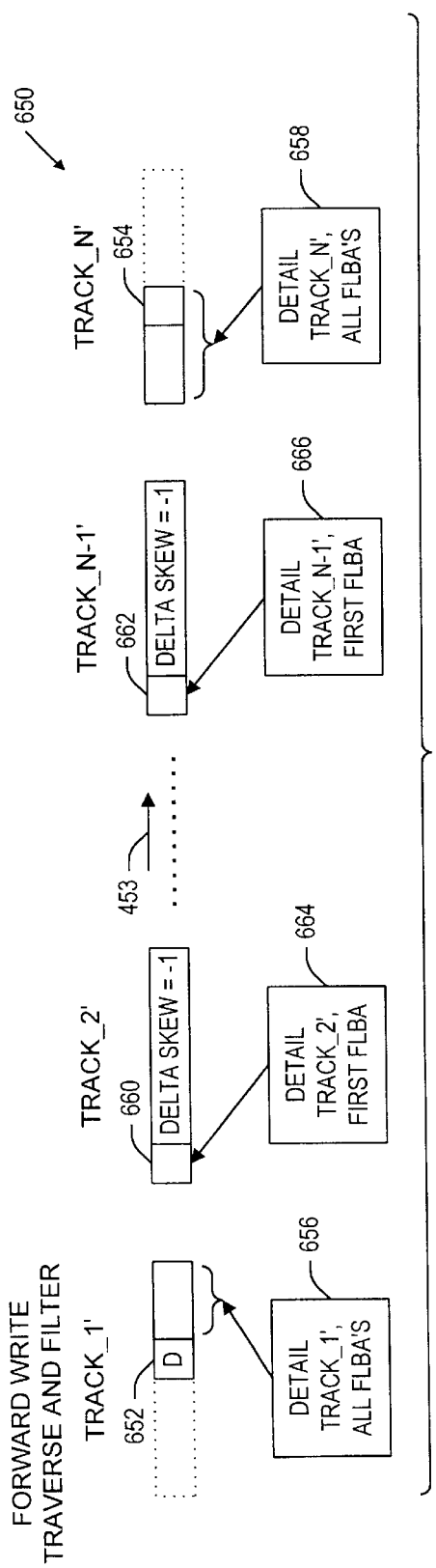
Figure 18B:
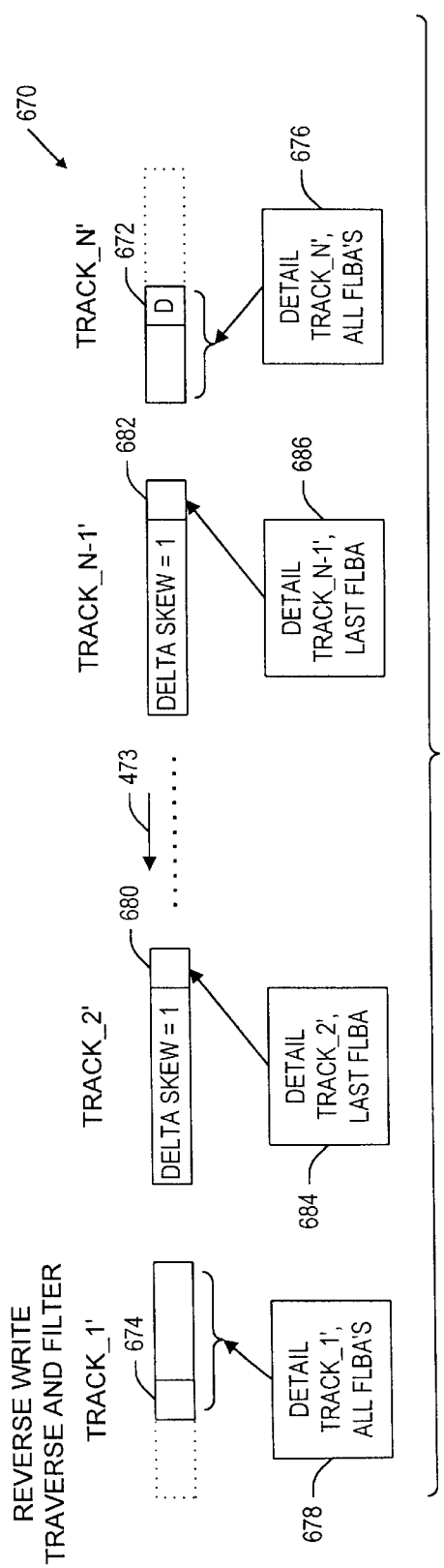
Figure 19A:
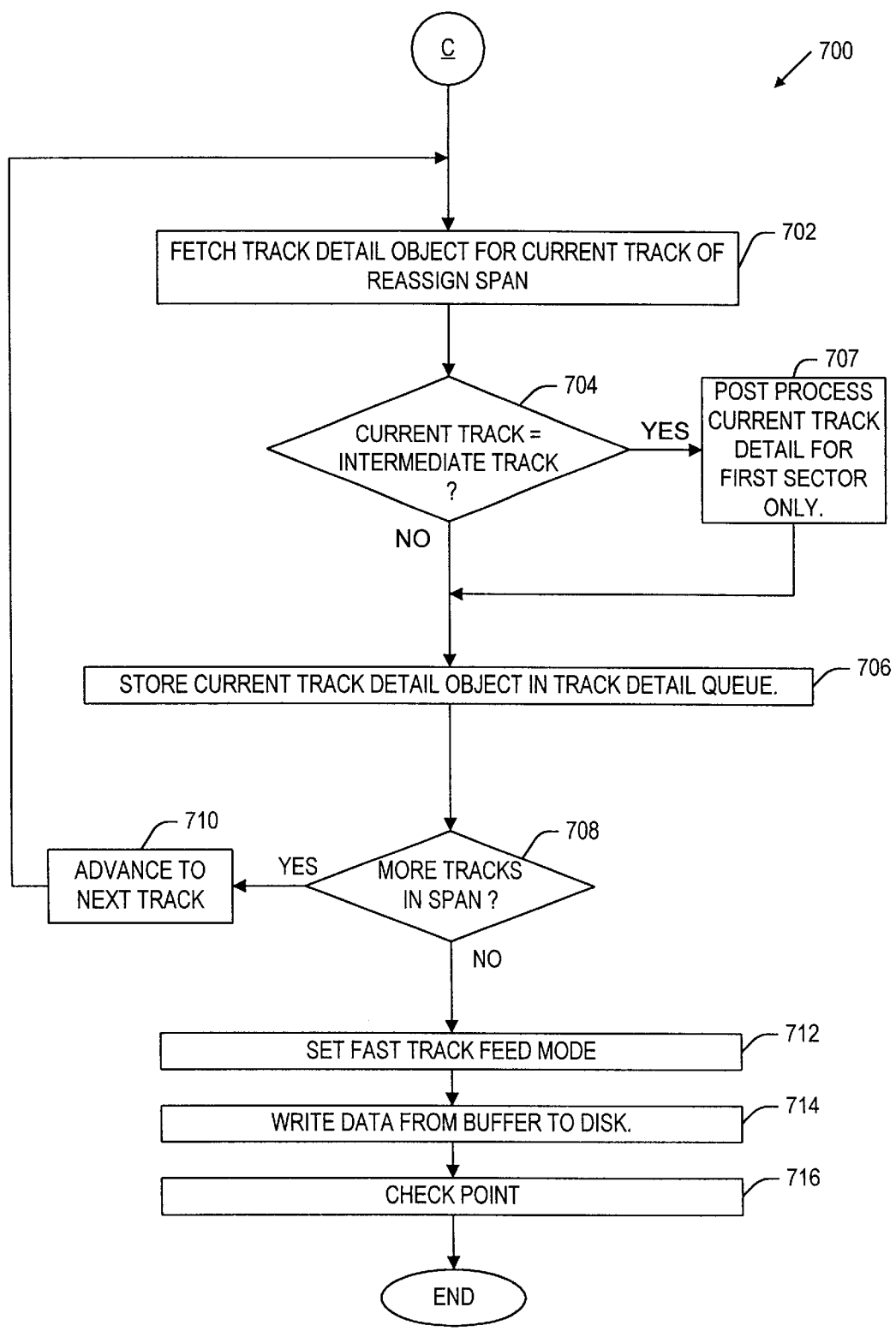
Figure 19B:
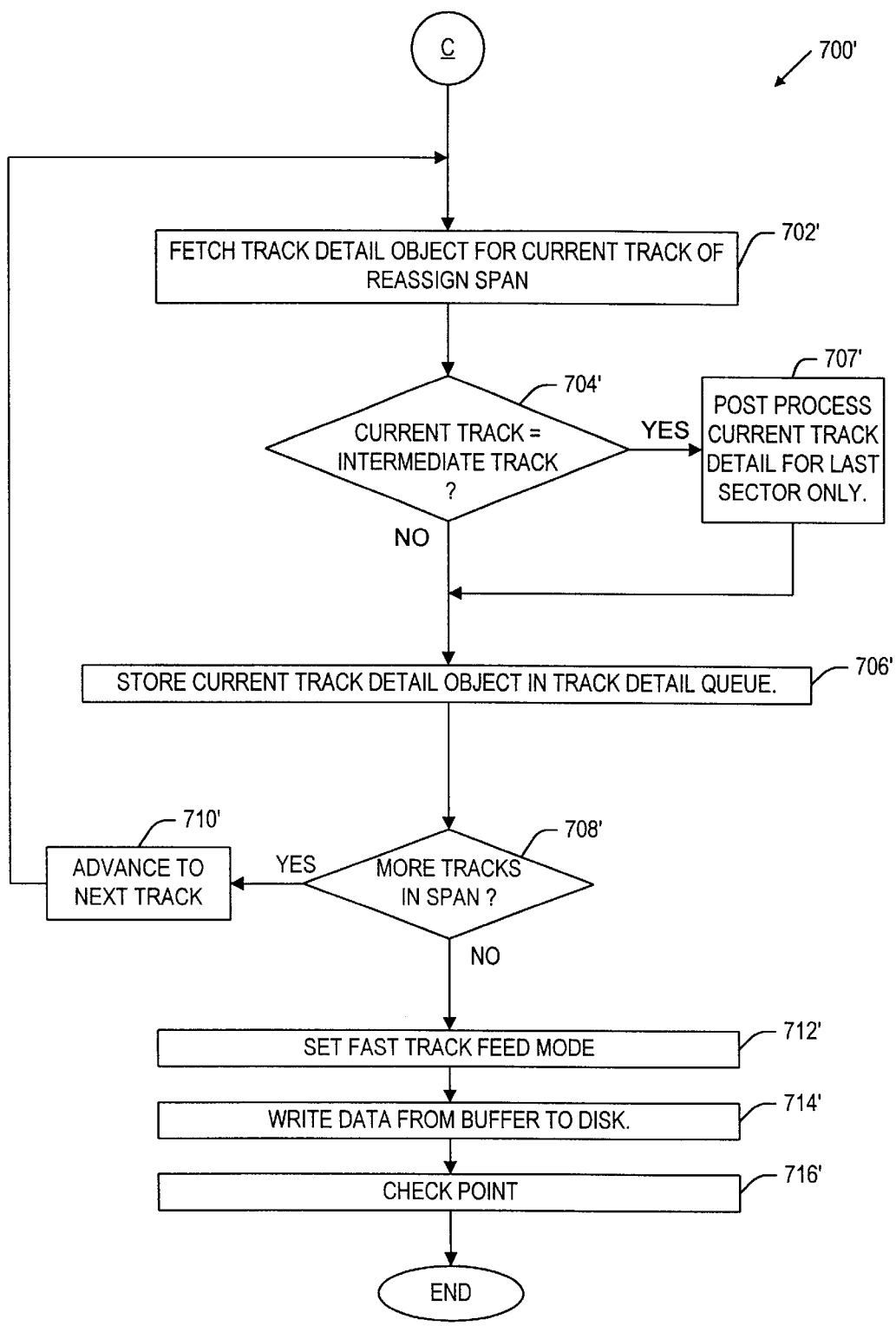
Figure 20:
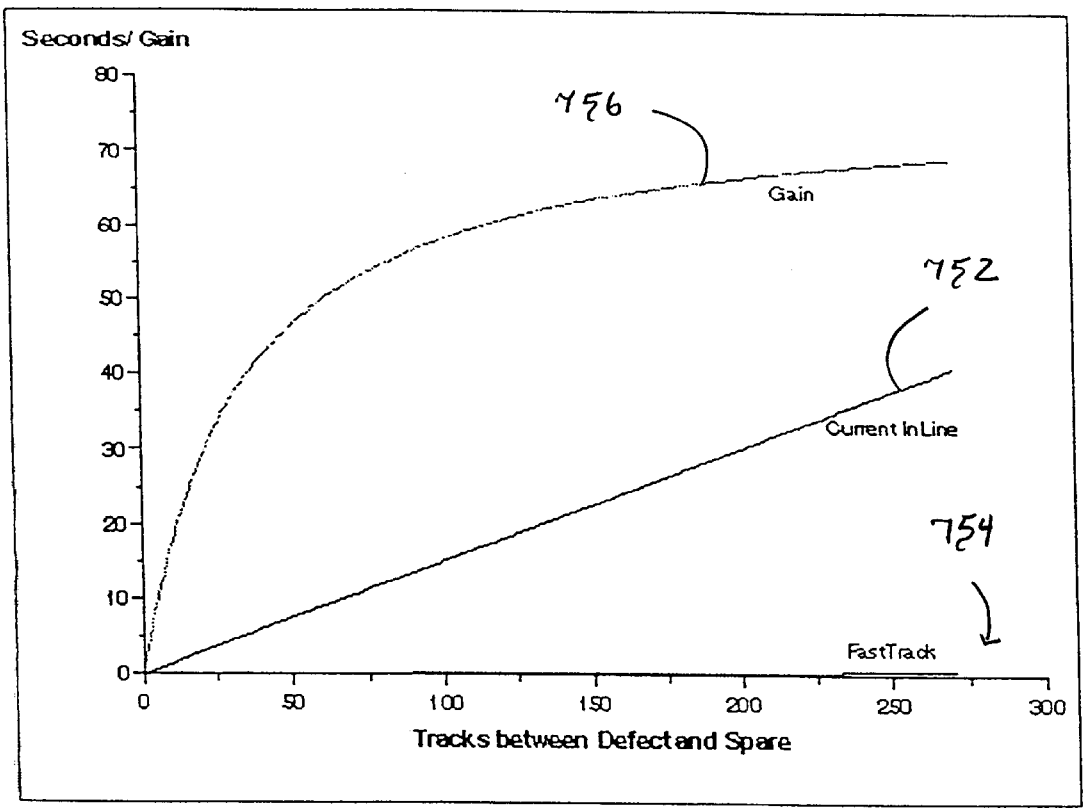

FIG. 6 is a block diagram illustrating a forward direction implementation of the fast track reassign process performed on a forward reassign span of sequential tracks including a first partial track having a reassign sector, a second partial track having a spare sector disposed in a forward direction relative to the reassign sector, and at least one intermediate track disposed between the first and second partial tracks;

FIG. 7 is a block diagram illustrating a reverse direction implementation of the fast track reassign process performed on a reverse reassign span of sequential tracks;

FIGS. 8A through 8E and 9A through 9E are track diagrams illustrating operation of a reassign skew determining sub-process of the fast track reassign process with respect to a variety of exemplary intermediate tracks having skip sectors disposed in various positions relative to the track ends;

FIGS. 10A and 10B are simplified track diagrams illustrating operation of the reassign skew determining sub-process of the reassign process with respect to overlapping reassign spans;

FIG. 11 is a table diagram illustrating a reassign skew table in accordance with the present invention including track entries each indicating a track and a corresponding reassign skew delta adjustment value generated in accordance with the fast track reassign process;

FIG. 12 is a block diagram illustrating a track detail object including information generated and used for implementing a transfer of a track, or a portion of a track, in the fast track reassign process;

FIGS. 13A and 13B are diagrams illustrating processed track detail objects for reading specified sectors of corresponding tracks of a reassign span in accordance with forward and reverse implementations respectively of the fast track reassign process;

FIGS. 14A and 14B are flow diagrams illustrating read traverse and filter sub-processes of the reassign operation of the present invention for a forward reassign span and a reverse reassign span respectively;

FIGS. 15A and 15B are block diagrams illustrating the contents of a data buffer and a track detail queue buffer after execution of the read traverse and filter sub-process for a forward reassign span a reverse reassign span respectively;

FIG. 16 is a flow diagram illustrating a fast track feed mode reading sub-process of the reassign operation of the present invention;

FIGS. 17A and 17B are flow diagrams illustrating defect map and skew table updating sub-processes of the reassign process of the present invention for the forward and reverse type reassign operations respectively;

FIGS. 18A and 18B are diagrams illustrating modified track detail objects for writing specified sectors of corresponding tracks of a forward reassign span and a reverse reassign span respectively; and FIGS. 19A and 19B are flow diagrams illustrating writing sub-processes of the reassign operation of the present invention for a forward reassign span and a reverse reassign span respectively; and FIG. 20 is a graph illustrating the time required for executing a reassign operation in accordance with the present as a function of the number of tracks between a reassign sector and a corresponding spare sector in an exemplary disk drive system.

DETAILED DESCRIPTION OF THE PREFERRED EMBODIMENTS

Figure 4:
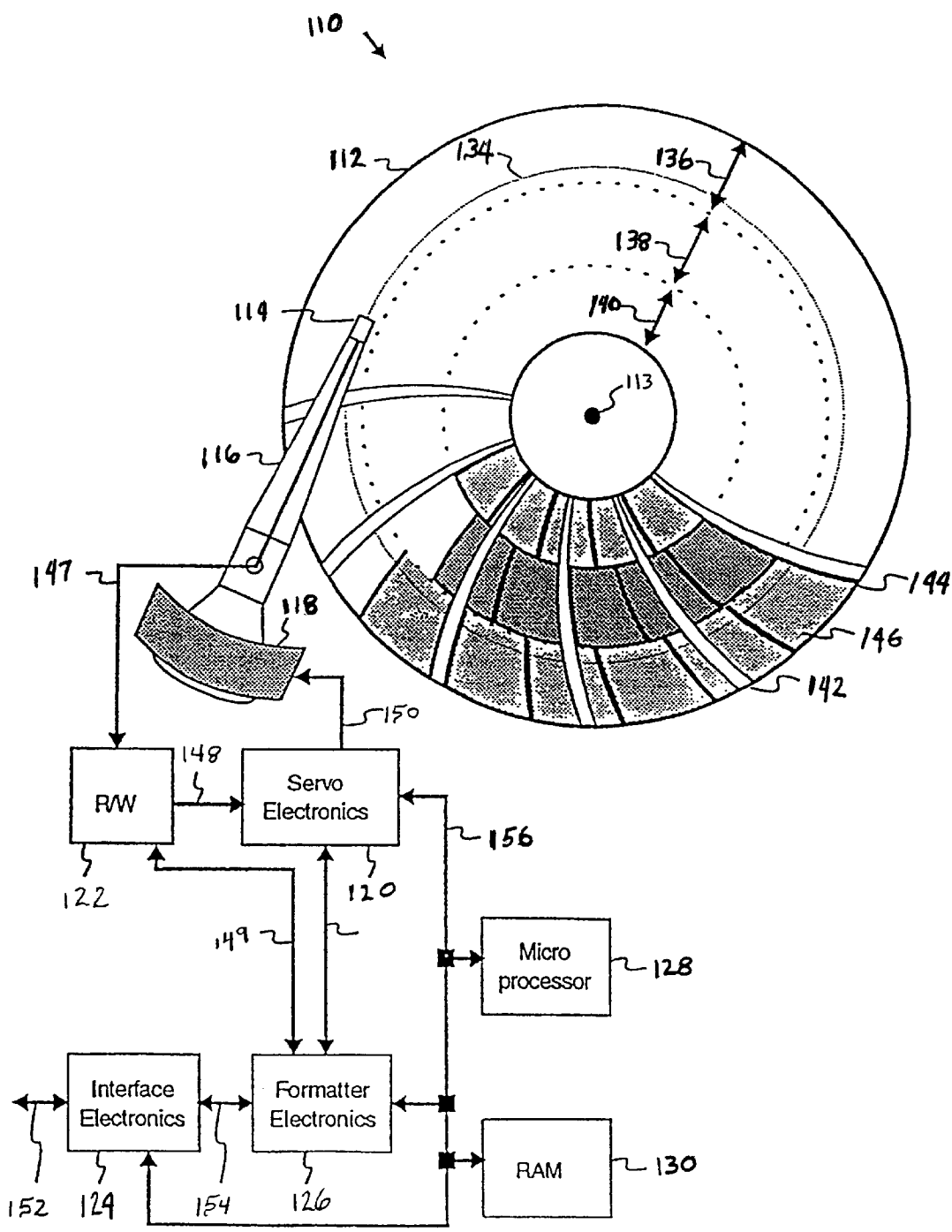
FIG. 4 is a block diagram of a disk drive suitable for practicing a fast track reassign operation according to the present invention.

Referring now to the drawing, FIG. 4 shows a block diagram of a disk drive at 110 suitable for practicing the present invention. The disk drive 110 includes: a disk 112 having a thin magnetic coating formed thereon for storing user data and position information on a plurality or concentric tracks, the disk being mounted to rotate about an axis 113; a data read/write head 114 for reading magnetic transitions on the disk 112; an arm assembly 116 for supporting the head 114 in close proximity to the rotating disk surface; and an actuator assembly 118 for driving the arm assembly to control the position of the head. In a preferred embodiment of the present invention, the disk drive 110 is a multiple disk drive array storage device (DASD) including a plurality of spindles each rotatably supporting a plurality of disks of the type depicted. The disk drive 110 also includes: a servo electronics unit 120; a read/write electronics unit 122; an interface electronics unit 124; a formatter electronics unit 126; a microprocessor 128; and a random access memory unit (RAM) 130.

The disk 112 is divided for head positioning purposes into a set of radially spaced tracks, one of which is shown at 134. The tracks are grouped radially into a number of zones, three of which are shown as 136, 138 and 140. The disk includes a plurality of servo sectors 142 which extend across the tracks in a generally radial direction. In the preferred embodiment, each track has a reference index 144. Within each zone, the tracks are also circumferentially divided into a number of data sectors 146. In the preferred embodiment, the disk drive 110 uses a No-ID™ format wherein the data sectors contain no sector ID fields. However, as will be understood by those skilled in the art, the fast track reassign process of the present invention is not limited to use in disk drive systems having a No-ID™ format.

In operation, read/write electronics unit 122 receives a read-back signal carrying user data and position information from head 114 via a bus 147, and is operative to provide servo information to servo electronics unit 120 via a bus 148. Read/write electronics unit 122 is also operative to provide data signals to formatter electronics unit 126 via a bus 149. Servo electronics unit 120 uses the servo information to produce a current at 150 which drives the actuator assembly 118 to position the head 114. Interface electronics unit 124 transmits and receives data and command information to and from a host system (not shown) over an interface bus 152. Interface electronics 124 also communicates with formatter electronics 126 via a bus 154. Microprocessor 128 communicates with the various other electronics over a bus 156. Interface electronics unit 124 receives requests from the host via interface bus 152 for reading and writing data sectors.

Formatter electronics unit 126 receives a list of requested data sectors from interface electronics 124 and converts them into corresponding zone, cylinder, head, and sector values (ZCHS values) which uniquely identify the location of the requested data sectors. The ZCHS information is passed to servo electronics unit 120 which positions the head 114 over an appropriate data sector on an appropriate cylinder. If the cylinder number provided to servo electronics 120 is not the same as the track number over which the head 114 is presently positioned, servo electronics 120 first executes a seek operation in order to reposition the head 114 over the appropriate cylinder.

Once servo electronics unit 120 has positioned the head 114 over the appropriate cylinder, servo electronics 120 begins executing sector computations in order to locate and identify the desired data sector. In the preferred embodiment, as servo sectors 142 pass under the head 116, an index mark identifies the first servo sector, and an address mark locates subsequent servo sectors as described in the aforementioned Best et al. patent.

In the preferred embodiment, servo electronics 120 and formatter electronics 126 include means for locating a data sector as taught by Hetzler et al. in U.S. Pat. No. 5,523,903, entitled "SECTOR SERVO DATA RECORDING DISK HAVING DATA REGIONS WITHOUT IDENTIFICATION (ID) FIELDS" which is incorporated herein by reference. Information maintained in servo electronics 120 and formatter electronics 126 identifies the location of the start of the next data sector relative to the present servo sector.

Figure 5:
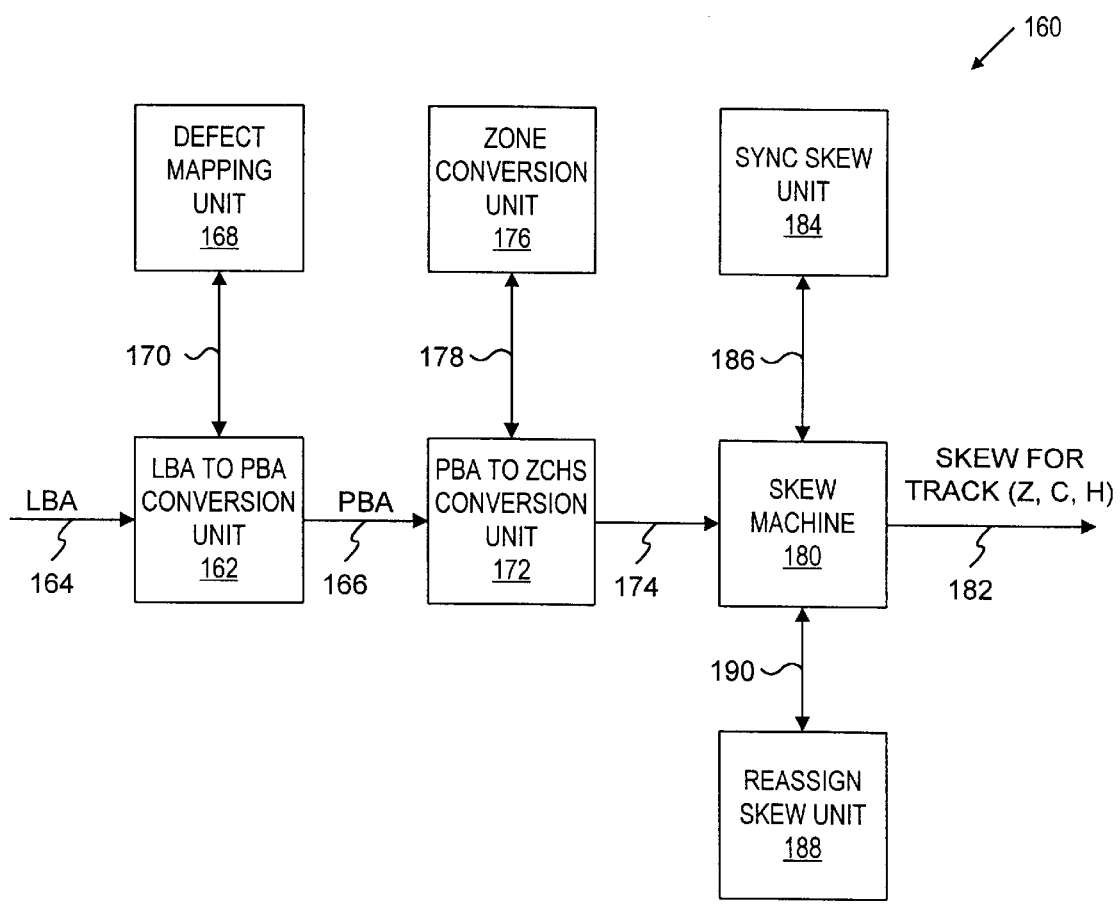
FIG. 5 is a block diagram illustrating a sector format conversion system for practicing the fast track reassign operation of the present invention, the system including a track reassign skew unit.

FIG. 5 shows a detailed block diagram at 160 of a fast track reassign sector format conversion system according to the present invention. In the preferred embodiment, the system 160 is implemented by formatter electronics unit 126 (FIG. 4). The system 160 receives requested data sectors in the form of logical block addresses (LBA's) from interface electronics 124 (FIG. 4) and converts them into corresponding ZCHS values uniquely identifying the location of the requested data sectors. The system 160 includes: an LBA to PBA conversion unit 162 for receiving the LBA's via a bus 164, and for providing corresponding physical block addresses (PBA's) to a bus 166; a defect mapping unit 168 referred to by the LBA to PBA conversion unit 162 via a bus 170; a PBA to ZCHS conversion unit 172 for receiving PBA's from unit 162 via bus 166, and for providing corresponding ZCHS values to a bus 174; a zone conversion unit 176 referred to by the PBA to ZCHS conversion unit 172 via a bus 178; a skew machine 180 for receiving ZCHS information from the PBA to ZCHS conversion unit 172 via bus 174, and for providing corresponding skewed ZCHS values to a bus 182; a synchronization skew unit 184 referred to by the skew machine 180 via a bus 186; and a reassign skew unit 188 according to the present invention which is referred to by the skew machine 180 via a bus 190.

In the preferred embodiment, the defect mapping unit 168 is implemented using a defect map taught by the aforementioned Dobbek patent application (United Kingdom Patent Application number 9425483.6) wherein the defect map removes the high order bits of each LBA to minimize the bits required in representing each defect. This defect map, which takes account of skip sectors including defects and spares, is implemented using: a virtual track (VT) table which includes entries representing the mostly redundant high order bits of the LBA; and a virtual sector (VS) table which includes entries representing only the low order bits of the LBA. The defect map is constructed using a primary defect list and a grown defect list, each of which is stored in a reserved area of the disk 112. The PBA to ZCHS conversion unit 172 refers to a zone conversion table of the zone conversion unit 176 in order to develop coefficients for use in computing the cylinder, head, and sector at which to perform the desired operation on the requested data sector.

In order to minimize the latency when performing sequential operations across track boundaries, cylinder boundaries, and zone boundaries, logical block addresses are staggered by some number of sectors. A sequential operation across track boundaries, for purposes of the present application, may arise due to a head switch, including switching from one head to another in a cylinder, or a switch across track boundaries within a single disk. The number of sectors by which a sequential operation is staggered is called the skew factor, or skew value. In a preferred embodiment, the disk drive system 110 is a multiple disk array storage system, and the skew factor includes: a raw skew factor having a track skew factor, a cylinder skew factor, and a zone (or notch) skew factor; and a synchronization skew factor used to shift sector locations in response to excessive defects occurring in a synchronization zone of the disk drive 110 (FIG. 4) thereby synchronizing the phase of the multiple disks in the system without consuming additional disk storage capacity. In the preferred embodiment, the skew machine 180 and synchronization skew unit 184 are implemented in accordance with the adaptive synchronization skew method taught by the afore-mentioned Dobbek patent (U.S. Pat. No. 5,586,606) wherein each track is arranged into synchronization zones, and an adaptive synchronization skew includes an excess transition time period associated with each synchronization zone for synchronizing the phase and speed of rotation of multiple disk storage devices.

Because a certain amount of time is required for the head to switch from a previous track to a target track, the skew factor must be sufficiently large to allow the head to make the transition from the previous track to the target track. Typically, skew time is designed so that the servo system successfully seeks to the target track within the skew time approximately 99% of the time. If the disk drive does not successfully seek to the target track within the skew time, a whole revolution time is lost. Generally, the normal skew time is optimized such that statistically only a very few track switches are not successfully achieved within the corresponding skew time.

For purposes of describing the present invention, a reassign span is defined to include: a first partial track having a reassign sector; a second partial track having a closest spare sector associated with the reassign sector, the spare sector being located in either of two directions relative to the reassign sector; and at least one intermediate track disposed between the first and second partial tracks. For purposes of describing the present invention, the first and second partial tracks of a reassign span are referred to as partial tracks because probably only a portion of the data sectors on these tracks needs to be reassigned to new sector locations. Specifically, only the data sectors of the first partial track disposed between and including the reassign sector and the trailing edge sector of the first track must be moved. Also, only those data sectors of the second track disposed between and including the leading edge sector of the second partial track and the spare sector location must be moved. In accordance with the fast track reassign operation of the present invention, the corresponding track skew factor associated with each of the intermediate tracks is adjusted so that the logical addresses of the sectors of each intermediate track are rotated at least one sector location in a direction opposite the direction of the spare, thereby effectively shifting the data stored in each sector of each intermediate track at least one sector location toward the spare sector.

FIG. 6 shows a block diagram depicting at 200 a simplified example of a reassign span including four sequential tracks 202, 204, 206, and 208 of the disk drive system 110 (FIG. 4) upon which a forward reassign operation is executed in accordance with the present invention. Each of the depicted tracks includes four sectors 210, each sector being an area of the corresponding track comprising storage media for storing a data sector, which as referred to below may comprise a fixed size portion of data or a variable sized portion of data, but is normally a fixed size portion of data. The depicted reassign span 200 is a simplified example of an actual reassign span which can include several hundred tracks spanning across zone, cylinder, and head boundaries, each track typically including a large number of sectors.

The four sequential tracks 202, 204, 206, and 208 collectively include 16 sectors 210 having corresponding original LBA values, 0 through 15, as shown underlined. In the depicted example, the first track 202 includes a reassign sector 212 which has an original LBA value of 2 as shown underlined. The last track 208 includes a spare sector 214 which is disposed in a forward direction indicated at 216 relative to the reassign sector 212. Intermediate tracks of the depicted reassign span, disposed between the first track 202 and the last track 208, include tracks 204 and 206.

Each of the depicted sectors 210, having corresponding original LBA values, 0 through 15, may be represented by an equivalent imaginary sector location 218 depicted as a dashed box having the same corresponding LBA values, also shown underlined. Because each of the tracks 202, 204, 206, and 208 is circular, a leading edge sector and a trailing edge sector, the two end sectors, of each track are physically adjacent to one another.

If the above described prior art reassign operation were performed on the depicted reassign span 200, each of the sectors 210 of each of the intermediate tracks 204 and 206 would have to be moved one sector location toward the spare sector 214 by the process of reading the data sectors stored in each of the sectors 210 of each of the intermediate tracks 204 and 206, and then rewriting each of these data sectors to a corresponding next sector 210 in the forward direction, crossing track boundaries where necessary. As further explained below, in accordance with the fast track reassign operation of the present invention, it is not necessary to move, by reading and then rewriting, all of the data sectors stored in the sectors 210 of the intermediate tracks 204 and 206. In the fast track reassign operation of the present invention, the data sector stored in only one sector of each of the intermediate tracks 204 and 206 must be moved by reading and then rewriting, while the data sectors stored in the remaining sectors of each of the intermediate tracks 204 and 206 is effectively moved as a result of adjusting the skew factor associated with each intermediate track as further explained below.

For each of the first track 202 and last track 208 of the reassign span, data sectors must be reassigned for only a portion of the sectors 210. Therefore, the first track 202 and the last track 208 are referred to as partial tracks. In an embodiment, all data sectors stored in each of the sectors 210 of the first track 202 disposed between and including the reassign sector 212 and the trailing edge sector of the first track 202 are moved in the forward direction 216 by reading and then rewriting each of the data sectors to a corresponding next sector 210. The trailing edge sector of the first track 202 is the sector 210 at the end of the first track 202 which is closest to the spare sector 214, that is the sector disposed at the right end of the first track 202. The data sector originally stored in the reassign sector 212, having the original LBA value of 2, is read, corrected using ECC codes if necessary and possible, and then rewritten to the next sector having the original LBA value of 3, as shown underlined. The data sector stored in the trailing edge sector of the first track 202, having the original LBA value of 3, must be read and then rewritten to a sector 210 of the next sequential track 204 which is to be indicated by a next sequential LBA value as further explained below.

Likewise, all data sectors stored in each of the sectors 210 of the last track 208 disposed between and including the leading edge sector of the last track and up to, but not including, the spare sector 214 are moved in the forward direction 216 by reading and then rewriting. The leading edge sector of the last track 208 is the sector 210 on the end of the last track 208 which is closest to the reassign sector 212, that is the sector on the left end of the last track 208.

In accordance with the forward reassign operation of the present invention, the track skew factor associated with each of the intermediate tracks 204 and 206 is decreased by a corresponding skew delta adjustment value provided by the reassign operation. As further described below, by reducing the track skew factor associated with a track by a single sector (by a delta skew value of one), the sector of the track having the highest original logical value is redefined to have the lowest logical value of all sectors on that track, and the sector of the track having the second highest original logical value becomes the sector of the track now having the highest logical value. In this manner, logical values associated with sectors of the track are rotated from back to front while data sectors are effectively shifted forward. By further reducing the skew factor associated with a track, the track is further rotated.

By reducing the track skew factor associated with an intermediate track by one sector, the sectors 210 of the intermediate track other than the trailing edge sector, along with the data sectors stored therein, are effectively shifted in the forward direction 216, toward the spare sector 214, by one sector. As described further below, this function eliminates the necessity of moving each and every data sector of the intermediate tracks by a process of reading and rewriting as is required in the prior art reassign process. As further explained below, the data sector stored in the first trailing edge non-skip data sector must be moved by reading then rewriting to the original trailing edge non-skip data sector of the next track. However, it is to be noted, that the data sector originally stored in the first trailing edge non-skip data sector of a track must be read before it is overwritten with a data sector read from the first trailing edge non-skip data sector of the previous track.

If the original trailing edge sector of an intermediate track is a skip sector, then the skew factor associated with the intermediate track must be decreased by an additional sector. Therefore, the skew delta adjustment value associated with each intermediate track for a forward reassign operation varies as a function of whether or not the trailing edge sector of the intermediate track, and other sectors adjacent thereto, are skip sectors. Skip sectors include spare sectors and or defective sectors. For the forward direction reassign process, the trailing edge sector of each intermediate track is the sector at the end of the intermediate track which is closest to the spare sector 214, that is the sector disposed at the right end of the intermediate track.

Specifically, for a forward direction reassign, the reassign operation determines the skew delta adjustment value associated with an intermediate track by determining the number of sectors between the leading edge sector of the track, and the first non-skip sector of the same intermediate track disposed in the reverse direction. Stated alternatively, the skew delta adjustment value associated with an intermediate track for-a forward direction reassign is set equal to the previously determined skew delta for that intermediate track plus the number of consecutive trailing edge skip sectors of the track plus one.

For example, if the first trailing edge sector 210 of intermediate track 204, which has an original LBA value of 7, as shown underlined, is a skip sector, then the skew factor associated with the intermediate track 204 must be reduced by a delta skew factor of 2. For a forward direction reassign operation, the skew delta adjustment value associated with a particular intermediate track is equal to the previously determined skew delta for that intermediate track plus the number of consecutive trailing edge skip sectors of the particular track plus one.

Also, as further explained below, the corresponding skew delta adjustment value varies dependent upon whether any additional reassign spans intersect with the current reassign span. A final result of a forward reassign operation of the present invention is that the non-skip sector of each intermediate track having the highest original logical value associated therewith is ultimately redefined to have the lowest logical value of that intermediate track, and this sector is also written with data previously read from the sector of the previous track having the highest original logical value of all sectors of the previous track.

In the depicted example, it is assumed that the first trailing edge sector of the intermediate track 204, originally designated by the LBA value of 7, shown underlined, is not a skip sector. It is further assumed that no additional reassign spans intersect with the depicted reassign span 200. Thus, as further described below, the skew delta adjustment value associated with the intermediate track 204 is equal to negative one, and so the original skew factor associated with the intermediate track 204 is reduced by one sector.

By reducing the track skew factor associated with intermediate track 204 by one sector, the track 204 is rotated by one sector in the reverse direction (left, or away from the spare sector) thereby effectively shifting each of the sectors 210 of intermediate track 204, along with the data sectors stored therein, in the forward direction 216, toward the spare sector 214, by one sector. By reducing the track skew factor associated with intermediate track 204 by one sector, the trailing edge sector of intermediate track 204, originally having the LBA value of 7 associated therewith is redefined to have an LBA value of 3, shown in brackets.

The data sector stored in the first non-skip trailing edge sector of each intermediate track must be read and then rewritten to a sector of the next sequential track which has a next sequential LBA value. The next sequential sector following a trailing edge sector of a track is the sector of the next sequential track which has the lowest LBA value of all sectors of that track. Because the skew factor associated with each of the intermediate tracks is reduced, the non-skip sector of each intermediate track originally having the highest original logical value associated therewith is ultimately redefined to have the lowest logical value of that intermediate track.

In the depicted example, data sectors stored in the first non-skip trailing edge sector 210 of each of the intermediate tracks 204 and 206 must be shifted by reading and then rewriting the data sector stored therein to the first non-skip trailing edge sector of the next track. In the depicted example, the data sector stored at the first non-skip trailing edge sector of intermediate track 204, originally indicated by an LBA value of 7, is read from track 204 and rewritten to the first non-skip trailing edge sector of the next intermediate track 206 which had an original LBA value of 11, shown underlined, and which is now the leading edge sector of track 206 being attributed the new LBA value of 7, as shown in brackets, as a result of the reduction of the skew factor by the reassign operation.

FIG. 7 shows a block diagram depicting at 240 a simplified example of a reassign span including four sequential tracks 242, 244, 246, and 248 of the disk drive system 110 (FIG. 4) upon which a reverse reassign operation is executed in accordance with the present invention. Each of the depicted tracks includes four sectors 210. The four sequential tracks 242, 244, 246, and 248 collectively include 16 sectors 210 having corresponding original LBA values, 0 through 14, as shown underlined. In the depicted example, the last track 248 includes a reassign sector 250, having an original LBA value of 13, as shown underlined. The first track 242 includes a spare sector 252 which is disposed in a reverse direction indicated at 254 relative to the reassign sector 250. Intermediate tracks of the depicted reassign span, disposed between the partial track 242 and the partial track 248, include intermediate tracks 244 and 246.

Because each of the tracks 242, 244, 246, and 248 is circular, the leading edge sector of each track is physically adjacent to the trailing edge sector of the same track. Each of the depicted sectors 210, having corresponding original LBA values 0 through 14, shown underlined, may be represented by an equivalent imaginary sector location 218 depicted as a dashed box having the same corresponding underlined LBA value.

In an embodiment, all data sectors stored in each of the sectors 210 of the first track 242 disposed between and including the trailing edge sector of the first track 242 and up to but not including the spare sector 252 are moved in the reverse direction 254 by reading and then rewriting each of the data sectors to a corresponding previous sector 210. The trailing edge sector of the first track 242 is the sector 210 at the end of the first track 242 which is closest to the reassign sector 250, that is the sector disposed at the right end of the first track 242. Likewise, all data sectors stored in each of the sectors 210 of the last track 248 disposed between and including the leading edge sector of the last track and the reassign sector 250 are moved one sector location in the reverse direction 254 by reading and then rewriting. The leading edge sector of the last track 248 is the sector 210 on the end of the last track 248 which is closest to the spare sector 252, that is the sector on the left end of the last track 248.

In accordance with the reverse reassign operation of the present invention, the track skew factor associated with each of the intermediate tracks 244 and 246 is increased by a corresponding skew delta adjustment value provided by the reassign operation. As further described below, by increasing the track skew factor associated with a track by one sector (by a skew delta adjustment value of one), the sector of the track having the lowest original logical value is redefined to have the highest logical value of all sectors on that track, and the sector of the track having the second lowest original logical value becomes the sector of the track now having the lowest logical value. By increasing the track skew factor associated with an intermediate track by one sector, the intermediate track is effectively rotated by one sector in a forward direction (right, or away from the spare sector) thereby effectively shifting the corresponding sectors 210 of each intermediate track, along with the data sectors stored therein, in the reverse direction 254, toward the spare sector 252, by one sector. As described further below, this function eliminates the necessity of moving each and every data sector of the intermediate tracks by a process of reading and rewriting as is required in the prior art reassign process.

As further explained below, the skew delta adjustment value associated with each intermediate track for a reverse reassign operation varies as a function of whether or not the leading edge sector of the intermediate track is a skip sector. For the reverse direction reassign process, the leading edge sector of each intermediate track is the sector at the end of the intermediate track which is closest to the spare sector 214, that is the sector disposed at the left end of the intermediate track. Specifically, the reassign operation determines the skew delta associated with a track by determining the number of sectors between the original trailing edge sector of the track (sector n–1), and the first non-skip sector of the track disposed in the forward direction, that is the first non-skip leading edge sector of the same intermediate track. Alternatively stated, for a reverse reassign operation, the skew delta adjustment value associated with a particular intermediate track is set equal to the previously determined skew delta value for that intermediate track plus the number of consecutive leading edge skip sectors of the track plus one.

Also, as further explained below, the corresponding skew delta adjustment value, generated by the reassign operation for each intermediate track, varies dependent upon whether any additional reassign spans intersect with the current reassign span. A final result of a reverse reassign operation of the present invention is that the non-skip sector of each intermediate track having the lowest original logical value associated therewith is ultimately redefined to have the highest logical value of that intermediate track.

In the depicted example, it is assumed that the leading edge sector of the intermediate track 244, originally designated by the LBA value of 3, shown underlined, is not a skip sector. It is further assumed that no additional reassign spans intersect with the depicted reverse reassign span 240. Thus, as further described below, the skew delta adjustment value associated with the intermediate track 244 is equal to one, and so the original skew factor associated with the intermediate track 244 is increased by one sector.

By increasing the track skew factor associated with intermediate track 244 by one sector, the leading edge sector of intermediate track 244, originally having the LBA value of 3 associated therewith is redefined to have an LBA value of 7, shown in brackets.

The non-skip data sector originally stored at the leading edge sector 210 of the intermediate track 246 must be shifted by reading and then rewriting the data sector stored therein to the first non-skip leading edge sector of the previous track 244. In the depicted example, the data sector stored at the first non-skip leading edge sector of intermediate track 246, which is originally indicated by an LBA value of 7, as shown underlined, is read from track 246 and written to the first non-skip leading edge sector of the preceding track 244 which had an original LBA value of 3, as shown underlined, and which is attributed the new LBA value of 7, as shown in brackets, as a result of the increase of the skew factor by one sector.

FIGS. 8A through 8E show table diagrams illustrating FLBA values and logical sector values associated with physical sectors of corresponding exemplary intermediate tracks of a reassign span, each of the tracks having a different number of skip sectors Y disposed in varying locations on the logical track. For ease of explanation, it is assumed that each of the intermediate tracks disputed in the table diagrams of FIGS. 8A through 8E includes sixteen physical sectors, and it is also assumed that the initial skew including the raw skew, sync skew, and previous reassign skew for each track (prior the forward direction fast track reassign process) is equal to one.

Each of the table diagrams of FIGS. 8A through 8E includes: a physical sector row 302 of physical sector values representing each of sixteen corresponding physical sectors of a corresponding track; an initial FLBA row 304 of previous FLBA values attributed to corresponding physical sectors of the corresponding track prior to the forward reassign process of the present invention; a previous logical sector row 306 of logical sector values attributed to corresponding physical sectors of the corresponding track prior to the forward reassign process of the present invention; a rotated FLBA row 308 of FLBA values attributed to corresponding physical sectors of the corresponding track after the forward reassign process of the present invention; and a rotated logical sector row 310 of logical sector values attributed to the corresponding physical sectors of the corresponding track after the forward reassign process of the present invention.

For the forward direction fast track reassign process of the present invention, the reassign operation determines the skew delta associated with an intermediate track by determining the number of sectors between the sector having the lowest logical value of all sectors of the track (the leading edge sector of the track) and the first non-skip sector of the track disposed in the reverse direction (beginning with the trailing edge sector of the track). Stated alternatively, the skew delta value associated with a intermediate track for a forward direction reassign is equal to the number of consecutive trailing edge skips of the track plus one.

FIG. 8A shows a table diagram at 300 illustrating previous and rotated FLBA values and logical sector values associated with physical sectors of a first exemplary intermediate track which does not include any skip sectors Y on the track. A previous leading edge sector, the sector initially having the lowest logical value of all sectors of the track, is physical sector "1", which has a logical sector value of "0" as indicated in row 306. The previous trailing edge sector of the track (having a logical sector value of "15") is physical sector "0" which is a non-skip sector as is also indicated in row 306. Because there is initially no trailing edge skips for the first exemplary track depicted in table 300, the skew delta adjustment value is determined to be "Skew-=1", or "Skew=Skew-1". Thus, the skew delta adjustment value associated with the track is negative one and the corresponding reassign-skewed track is skewed 1 sector location in the reverse direction. Note that the previous trailing edge sector, physical sector "0", becomes the leading edge sector in the rotated track and is attributed the FLBA value "99" as indicated in row 308, the FLBA value of "99" being taken from a previous track in the reassign span.

FIG. 8B shows a table diagram at 314 illustrating previous and rotated FLBA values and logical sector values associated with physical sectors of a second exemplary intermediate track which includes skip sectors Y in the middle of the logical track. The previous leading edge sector, the sector having the lowest logical value of all sectors of the track, is physical sector "1", which has a logical sector value of "0" as indicated in row 306. Physical sectors 5, 6, 7, and 8, which are located in the middle of the logical track, are skip sectors. The trailing edge sector of the track having a logical sector value of "15" is physical sector "0" which is a non-skip sector.

Therefore, there are no trailing edge skips for the first exemplary track depicted in table 300 and the skew delta adjustment value is therefore determined to be "Skew-=1", or "Skew=Skew-1". Thus, the skew delta associated with the track is negative one and the corresponding reassign-skewed track is skewed 1 sector location in the reverse direction. Note that the original trailing edge sector, physical sector "0", becomes the leading edge sector and is attributed the FLBA value "99" as indicated in row 308, the FLBA value of "99" being taken from a previous track in the reassign span.

FIG. 8C shows a table diagram at 320 illustrating previous and rotated FLBA values and logical sector values associated with physical sectors of a third exemplary intermediate track which includes skip sectors Y at the start and in the middle of the logical track. The previous leading edge sector, the sector having the lowest logical value of all sectors of the track, is physical sector "1", which has a logical sector value of "0" as indicated in row 306. Physical sectors 1 and 2 which are located at the start of the logical track, at the first two leading edge sectors, are skip sectors as indicated in row 304. The previous trailing edge sector of the track having a logical sector value of "15" is physical sector "0" which is a non-skip sector as indicated in row 304. Therefore, there are no trailing edge skips for the third exemplary track depicted in table 320 and the skew delta adjustment value is therefore determined to be "Skew-=1", or "Skew=Skew-1". Thus, the skew delta associated with the track is negative one and the corresponding reassign-skewed track is skewed 1 sector location in the reverse direction. Note that the original trailing edge sector, physical sector "0", becomes the leading edge sector and is attributed the FLBA value "99" as indicated in row 308, the FLBA value of "99" being taken from a previous track in the reassign span.

FIG. 8D shows a table diagram at 324 illustrating previous and rotated FLBA values and logical sector values associated with physical sectors of a fourth exemplary intermediate track which includes skip sectors Y in the middle and at the end of the logical track. The previous leading edge sector, the sector having the lowest logical value of all sectors of the track, is physical sector "1", which has a logical sector value of "0" as indicated in row 306.

The previous trailing edge sector, physical sector "0" (logical sector 15), which has the highest logical value of all sectors of the track, is a skip sector as indicated in row 304. Also, physical sectors "14" and "15", which have the next highest logical values of the track, are previously skip sectors as indicated in row 304. As mentioned above, for the forward direction fast track reassign process of the present invention, the reassign operation determines the skew delta associated with an intermediate track by determining the number of consecutive trailing edge skips of the track (starting from the logical track end and counting backwards) plus one. For the intermediate track described by the table diagram 324, starting from the previous logical track end (logical sector 15 indicated in row 306) and counting in the reverse logical direction, there are three consecutive trailing edge skips including physical sectors 0, 14, and 15. Therefore, the skew delta adjustment value is determined to be "Skew-=4", or "Skew=Skew-4". Thus, the skew delta adjustment value associated with the track is negative four and the corresponding reassign-skewed track is skewed 4 sector locations in the reverse direction. Note that physical sector 13", which becomes the leading edge sector (having a logical sector value of zero as indicated in row 310), is attributed the FLBA value "99" as indicated in row 308, the FLBA value of "99" being taken from a previous track in the reassign span.

FIG. 8E shows a table diagram at 328 illustrating previous and rotated FLBA values and logical sector values associated with physical sectors of a fifth exemplary intermediate track which includes skip sectors Y in the middle and at both ends of the logical track. The previous leading edge sector (physical sector "1", which is initially logical sector "0") is a skip sector as indicated in row 304. Also, the trailing edge sector (physical sector "0", which is initially logical sector "15") is a skip sector as is also indicated in row 304. Also, physical sectors "14" and "15", which have the next highest logical values of the track, are also skip sectors.

As mentioned above, for the forward direction fast track reassign process of the present invention, the reassign operation determines the skew delta associated with an intermediate track by determining the number of consecutive trailing edge skips of the track (starting from the logical track end and counting backwards) plus one. For the intermediate track described by the table diagram 328, starting from the logical track end (logical sector 15) and counting in the reverse logical direction, there are three consecutive trailing edge skips. Therefore; the skew delta adjustment value is therefore determined to be "Skew-=4", or "Skew=Skew-4". Thus, the skew delta associated with the track is negative four and the corresponding reassign-skewed track is skewed 4 sector locations in the reverse direction. Note that physical sector "13", which becomes the leading edge sector (having a logical sector value of zero as indicated in row 310), is attributed the FLBA value "99", as indicated in row 308, the FLBA value of "99" being taken from a previous track in the reassign span. Note also that leading edge skips do not effect the skew delta adjustment value for the forward reassign operation of the present invention.

FIGS. 9A through 9E are track table diagrams depicting five exemplary intermediate tracks representing intermediate tracks 134 (FIG. 4) of a reassign span in a linear form, and corresponding rotated tracks representing the intermediate tracks respectively as reassign-skewed, or rotated, in accordance with the corresponding skew delta adjustment values provided by the reassign operation in accordance with previous skew delta determining phase of the reverse direction fast track reassign process of the present invention. For ease of explanation, it is assumed that each of the intermediate tracks depicted in the table diagrams of FIGS. 9A through 9E includes sixteen physical sectors, and it is also assumed that the initial skew including the raw skew, sync skew, and previous reassign skew for each track (prior to the reverse direction fast track reassign process) is equal to one.

Each of the table diagrams of FIGS. 9A through 9E includes: a physical sector row 302 of physical sector values representing each of sixteen corresponding physical sectors of a corresponding track; an initial FLBA row 304 of previous FLBA values attributed to corresponding physical sectors of the corresponding track prior to the reverse reassign process of the present invention; a previous logical sector row 306 of logical sector values attributed to corresponding physical sectors of the corresponding track prior to the reverse reassign process of the present invention; a rotated FLBA row 308 of FLBA values attributed to corresponding physical sectors of the corresponding track after the reverse reassign process of the present invention; and a rotated logical sector row 310 of logical sector values attributed to the corresponding physical sectors of the corresponding track after the reverse reassign process of the present invention.

As mentioned above, the skew delta adjustment value associated with each intermediate track for the reverse reassign operation varies as a function of the positions of skip sectors in the forward direction relative to the trailing edge (logical sector n−1 position for a track having n sectors) of the tracks. For each of the intermediate tracks of a reverse reassign span, disposed between a reassign sector and a corresponding spare sector, the reassign operation provides a corresponding positive skew delta adjustment value for increasing the track skew factor associated with the track. By increasing a track skew factor by a corresponding skew delta adjustment value, the track is effectively rotated in a reverse direction by a number of sectors equal to the corresponding skew delta adjustment value. A corresponding skew delta adjustment values generated for each of the tracks is shown adjacent the rotated tracks, and the skewing of each of the tracks is depicted in linear increments each representing an increment of rotation.

For the reverse direction fast track reassign process of the present invention, the reassign operation determines the skew delta adjustment value associated with an intermediate track by determining the number of sectors between the trailing edge sector (having the highest logical value of the track, logical sector n−1), and the first non-skip sector of the track disposed in the forward direction. Stated alternatively, the skew delta adjustment value associated with an intermediate track for a reverse direction reassign operation is set equal to the previously determined skew delta value for that intermediate track plus the number of consecutive leading edge skips of the track plus one.

FIG. 9A shows a table diagram at 330 illustrating previous and rotated FLBA values and logical sector values associated with physical sectors of a first exemplary intermediate track which does not include any skip sectors Y on the track. A previous trailing edge sector, the sector having the highest logical value of all sectors of the track, is physical sector "0", which has a logical sector value of "15" as indicated in row 306. The previous leading edge sector of the track having a logical sector value of "0" is physical sector "1" which is a non-skip sector. Therefore, there are no leading edge skips for the first exemplary track depicted in table 330 and the skew delta adjustment value is therefore determined to be "Skew+=1", or "Skew-Skew+1". Thus, the skew delta associated with the track is positive one and the corresponding reassign-skewed track is skewed 1 sector location in the forward direction. Note that physical sector "1", which becomes the trailing edge sector (having a logical sector value of "15" as indicated in row 310), is attributed the FLBA value "116" as indicated in row 308, the FLBA value of "116" being taken from the next track in the reassign span.

FIG. 9B shows a table diagram at 334 illustrating previous and rotated FLBA values and logical sector values associated with physical sectors of a second exemplary intermediate track which includes skip sectors Y in the middle of the logical track. A previous trailing edge sector, the sector having the highest logical value of all sectors of the track, is physical sector "0", which has a logical sector value of "15" as indicated in row 306. Physical sectors 5, 6, and 8, which are located in the middle of the logical track, are skip sectors. The previous leading edge sector of the track having a logical sector value of "0" is physical sector "1" which is a non-skip sector as indicated in row 304.

Therefore, there are no leading edge skips for the second exemplary track depicted in table 334 and the skew delta adjustment value is therefore determined to be "Skew+=1", or "Skew=Skew+1". Thus, the skew delta associated with the track is positive one and the corresponding reassign-skewed track is skewed 1 sector location in the forward direction.

Note that physical sector "1", which becomes the trailing edge sector (having a logical sector value of "15" as indicated in row 310), is attributed the FLBA value "113" as indicated in row 308, the FLBA value of "113" being taken from the next track in the reassign span.

FIG. 9C shows a table diagram at 338 illustrating previous and rotated FLBA values and logical sector values associated with physical sectors of a third exemplary intermediate track which includes skip sectors Y at the start and in the middle of the logical track. A previous leading edge sector, the sector having the lowest logical value of all sectors of the track, is physical sector "1", which has a logical sector value of "0" as indicated in row 306. Physical sectors 1 and 2 which are located at the start of the logical track, the first two leading edge sectors, are skip sectors as indicated in row 304. The previous trailing edge sector of the track having a logical sector value of "15" is physical sector "0" which is a non-skip sector as indicated in row 304. Therefore, there are two leading edge skips for the third exemplary track depicted in table 338 and the skew delta adjustment value is therefore determined to be "Skew+=3", or "Skew=Skew+3". Thus, the skew delta adjustment value associated with the track is positive 3 and the corresponding reassign-skewed track is skewed 3 sector locations in the forward direction. Note that physical sector "3", which becomes the trailing edge sector having a logical sector value of "15" as indicated in row 310, is attributed the FLBA value "112" as indicated in row 308, the FLBA value of "112" being taken from the next track in the reassign span.

FIG. 9D shows a table diagram at 346 illustrating previous and rotated FLBA values and logical sector values associated with physical sectors of a fourth exemplary intermediate track which includes skip sectors Y in the middle and at the end of the logical track. The previous trailing edge sector, physical sector "0" (logical sector 15), which has the highest logical value of all sectors of the track, is a skip sector as indicated in row 304. Also, physical sectors "14" and "15", which have the next highest logical values of the track, are skip sectors as indicated in row 304. As mentioned above, for the reverse direction fast track reassign process of the present invention, the reassign operation determines the skew delta associated with an intermediate track by determining the number of consecutive leading edge skips of the track plus one. For the intermediate track described by the table diagram 346, there are no leading edge skips. Therefore, the skew delta adjustment value is therefore determined to be "Skew+=1", or "Skew=Skew+1". Thus, the skew delta associated with the track is positive one and the corresponding reassign-skewed track is skewed 1 sector locations in the forward direction. Note that physical sector "1", which becomes the trailing edge sector (having a logical sector value of "15" as indicated in row 310), is attributed the FLBA value "108" as indicated in row 308, the FLBA value of "108" being taken from the next track in the reassign span.

FIG. 9E shows a table diagram at 348 illustrating previous and rotated FLBA values and logical sector values associated with physical sectors of a fifth exemplary intermediate track which includes skip sectors Y in the middle and at both ends of the logical track. The leading edge sector (physical sector "1", which is initially logical sector "0") is a skip sector as indicated in row 304. Also, the trailing edge sector (physical sector "0", which is initially logical sector "15") is a skip sector. Also, physical sectors "14" and "15", which have the next highest logical values of the track, are also skip sectors as indicated in row 304.

The previous trailing edge sector, physical sector "0" (logical sector 15) is a skip sector. Physical sectors 1, 2, and 3 which are previously located at the start of the logical track, at the first three leading edge sectors, are skip sectors as indicated in row 304. Also, physical sectors 14, 15, and 0, which are located at the end of the logical track, at the three trailing; edge sectors, are skip sectors.

As mentioned above, for the reverse direction fast track reassign process of the present invention, the reassign operation determines the skew delta associated with an intermediate track by determining the number of consecutive leading edge skips of the track plus one. For the intermediate track described by the table diagram 348, there are three leading edge skips. Therefore, the skew delta adjustment value is therefore determined to be "Skew+=4", or "Skew= Skew+4". Thus, the skew delta associated with the track is positive four and the corresponding reassign-skewed track is skewed 4 sector locations in the forward direction.

Note that physical sector "4", which becomes the trailing edge sector (having a logical sector value of "15" as indicated in row 310), is attributed the FLBA value "106" as indicated in row 308, the FLBA value of "106" being taken from the next track in the reassign span. Note also that leading edge skips do not effect the skew delta adjustment value for the forward reassign operation of the present invention.

FIGS. 10A and 10B are reassign span diagrams illustrating operation of a second skew delta determining phase of the fast track reassign process with respect to an exemplary plurality of overlapping reassign spans. As mentioned above, the skew delta adjustment value generated by the reassign operation for each intermediate track of a reassign span varies dependent upon whether any additional reassign spans intersect with the current reassign span. For a track included in a portion of a reassign span which is overlapping another reassign spans, the total delta skew value associated with the overlapped track is determined by summing the delta skew values assigned to the overlapping tracks of the overlapping reassign spans in accordance with the above described first phase of the skew delta determining process. With reference to FIG. 10A, a first reverse reassign span 350 includes a track_A 352 having a reassign sector (not shown), and a track_B 352 having a spare sector (not shown). A second reverse reassign span 360 includes a track_C 362 having a reassign sector (not shown), and a track_D 364 having a spare sector (not shown). For ease of explanation, in the depicted example, it is assumed that for all intermediate tracks of the first and second reassign spans 350 and 360, the number of sectors between the trailing edge sector, and the first non-skip sector of the track disposed in the forward direction is one. Therefore, the reassign operation provides a corresponding skew delta of 1 for each of the intermediate tracks of the first and second reassign spans 350 and 360 in accordance with the first phase of the skew delta determining process as described above. In accordance with the second phase of the skew delta determining process, the total delta skew value associated with each overlapped track of the overlapping reassign spans is determined by summing the delta skew values for each overlapping track resulting in total skew values of 2 for each overlapping track.

With reference to FIG. 10B, a forward reassign span 370 includes a first track_E 372 having a reassign sector (not shown), and a last track_F 374 having a spare sector (not shown). A reverse reassign span 380 includes a track_G 382 having a reassign sector (not shown), and a last track_H 384 having a corresponding spare sector (not shown). For ease of explanation, in the depicted example, it is assumed that for all intermediate tracks of the forward reassign span 370, the number of sectors between the leading edge sector, and the first non-skip sector of the track disposed in the reverse direction is one. Therefore, the reassign operation provides a corresponding skew delta adjustment value of −1 for each of the intermediate tracks of the forward reassign span 370 in accordance with the first phase of the skew delta determining process as described above. Likewise, it is assumed that for all intermediate tracks of the reverse reassign span 380, the number of sectors between the trailing edge sector, and the first non-skip sector of the track disposed in the forward direction is one. Therefore, the reassign operation provides a corresponding skew delta adjustment value of 1 for each of the intermediate tracks of the reverse reassign span 380. In accordance with the second phase of the skew delta determining process, the total delta skew value associated with each overlapped track of the overlapping forward reassign span 370 and reverse reassign span 380 is determined by summing the delta skew values for each corresponding pair of overlapping tracks resulting in total skew values of zero for each corresponding pair of overlapping tracks.

FIG. 11 shows a reassign skew table diagram at 400 illustrating a reassign skew table including a cylinder column, a head column, and a skew delta column. A single track entry in the table includes a cylinder value and a corresponding head value which define a track 134 (FIG. 4). For each track entry, the reassign skew table provides a corresponding skew delta adjustment value attributed to the corresponding track in accordance with the reassign process of the present invention. In the preferred embodiment, the reassign skew table 400 is stored during the reassign operation. In the preferred embodiment, the reassign table 400 is generated by the reassign operation in accordance with the first and second phases of the skew delta determining process as described above.

Each set of entries indicates a next track of a disk file which is assigned a reassign skew delta adjustment value different from the reassign skew delta adjustment value of the previous entry. During sector format conversion operations of the disk drive, the reassign skew table 400 is referenced to determine a reassign skew delta adjustment value for a particular track, having a particular track value, by finding: a first track entry, defined by corresponding cylinder and head values, which is greater than the particular track value; and a second track entry, defined by corresponding cylinder and head values, which is less than or equal to the particular track value. The reassign skew delta adjustment value for the particular track is determined to be equal to the reassign skew delta adjustment value associated with the second track entry which is less than or equal to the particular track.

As an example using the depicted table, assume that a particular track value is defined by cylinder 100, head 9. The particular track value is greater than the values of the track entry of the table defined by cylinder 100, head 7, but less than the values of the track entry of the table defined by cylinder 101, head 2. Therefore, the reassign skew value for the particular track is determined to be equal to the reassign skew value associated with cylinder 100, head 7, which is one.

Figure 2A:
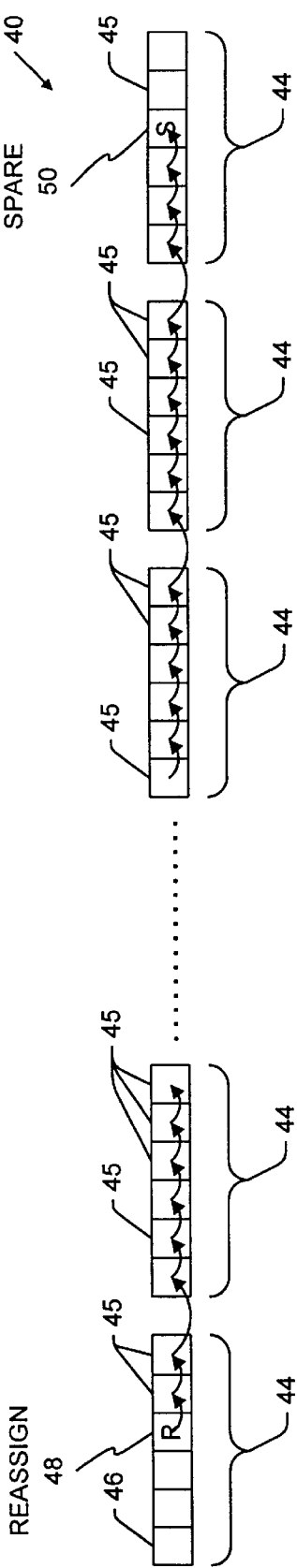
FIGS. 2A and 2B are block diagrams depicting prior art in-line reassign operations implemented in forward and reverse directions respectively for reassigning a span of sectors using a closest spare sector.
Figure 2B:
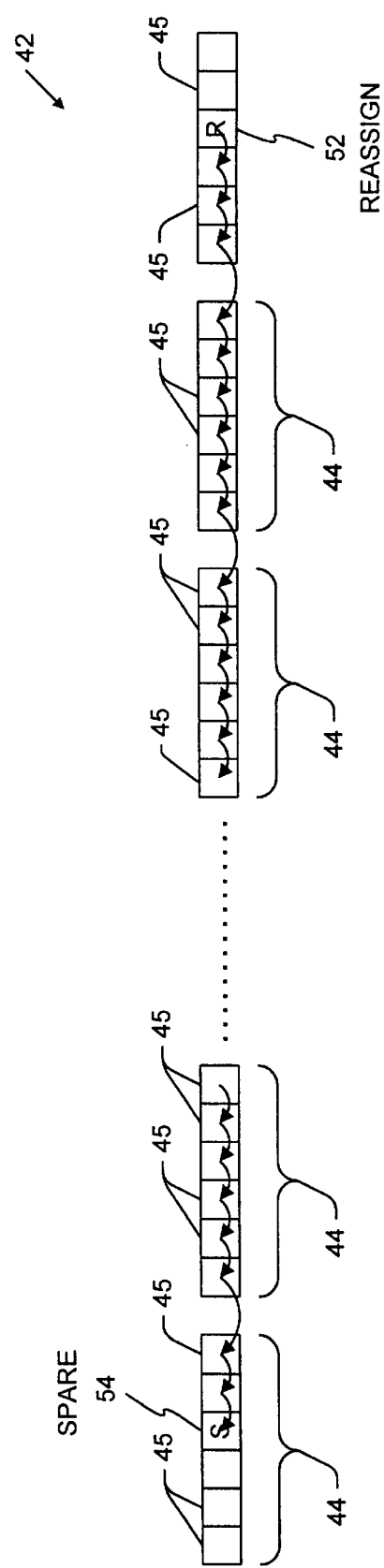

FIG. 12 depicts a track detail object at 420 in accordance with the present invention. The track detail object 420, which is similar to the prior art track detail object (FIG. 2), includes information required for implementing a transfer of a corresponding track, or portion of the corresponding track, in accordance with the reassign process of the present invention. The track detail object 420 comprises information included within a conventional track detail object including: a current zone table field, a current FLBA field, a next boundary FLBA field, a field indicating the number of non-skip sectors until the next boundary FLBA, a beginning VT pointer field, a current VT pointer field, an ending VT pointer field, a current spindle synchronization zone field, a field indicating a current raw skew value, a field for storing a current synchronization skew value, a field for storing a current total skew value, a field for storing a current cylinder value, a field for storing a current sector value, a field for storing a value indicating the number of sectors until a real boundary, a field for storing a current head value, and a field for storing a value indicating the number of cylinders left in SSZ.

The track detail object 420 also comprises fields used for the reassign process of the present invention which include: a reassign skew field 422 for storing the reassign skew value associated with the corresponding track which, in the preferred embodiment, is accessed from the reassign skew table 400 (FIG. 11), a buffer address field 424 for storing a value indicating a buffer address for storing the reassign skew entry currently used; a next cylinder field 426 for storing a next cylinder value, accessed from the reassign skew table, indicating a next cylinder having a reassign skew delta adjustment value different from a current reassign skew delta adjustment value; a next head field 428 for storing a next head value, accessed from the reassign skew table, indicating a next head with a reassign skew delta adjustment value different from a current reassign skew delta adjustment value.

The track detail object 420 further includes: a current state field 430; a starting sector field 432 for storing a starting sector value; a length of transfer field 434 for storing a value indicative of the number of blocks (or sectors) to transfer; a skip count field 436 for carrying a value indicative of the number of skip sectors on the corresponding track; and a field 438 for carrying a value indicative of a maximum number of skips sectors per track. Front end hardware (not shown) for transferring data stored on a track, or a portion of a track, includes: a starting sector register for receiving the starting logical sector value; a skew register for receiving a skew value; a length-of-transfer register for receiving the value indicative of the number of blocks to transfer; and a first-in-first-out buffer (FIFO) for receiving the skip locations which include the locations of defective sectors and spare sectors.

Conventionally, a track detail object is generated for each track upon transfer of the data stored in the track. A sector format conversion system receives a logical block address from the host system, and determines corresponding ZCHS values for the starting sector of the transfer. Relationship (2), below, yields a physical sector location based on a logical sector value, a total skew value, and a number of sectors per track.

Physical sector=logical sector+Skew (Modulo, number of sectors per track) (2)

The length of the data transfer, which may span several tracks, is also received from the host. Skip information for the transfer, derived from the VT and VS tables of the defect mapping unit 168 (FIG. 5), is loaded into the FIFO for storing the skips locations.

In one embodiment of the reassign process of the present invention, a track detail object 420 is generated for each track of a reassign span in accordance with a read traverse and filter sub-process wherein track details are accessed, post-processed where necessary, and then stored in a track detail queue for use in a subsequently executed fast streaming process; Data is not transferred until after the read traverse and filter sub-process. After the track detail objects for each track of the reassign span are queued in a buffer, the disk drive is set to operate in a fast track feed mode wherein the track detail objects are streamed out of the buffer for a fast transfer which may be executed within the skew time associated with the corresponding track. In an alternative embodiment of the reassign process of the present invention, a high speed processor may be used to perform the necessary track detail calculations during a transfer "on the fly" wherein track detail objects need not be generated and stored for each track prior to the transfer.

FIG. 13A shows a reassign span track detail diagram including a reassign span at 450 having a plurality of N sequential tracks TRACK_1, TRACK_2, ..., TRACK_N of the disk drive system 110 (FIG. 4) for which a forward read traverse and filter sub-process executed in accordance with the forward fast track reassign process of the present invention. The depicted reassign span includes a first partial track TRACK_1 having a reassign sector 452, a second partial track TRACK_N having a spare sector 454 disposed in a forward direction relative to the reassign sector 452, and a plurality of intermediate tracks TRACK_2 ... TRACK_N–1 disposed between the first and second partial tracks.

As described above, the data sectors stored in each of the sectors of TRACK_1 disposed between and including the reassign sector 452 and a trailing edge sector 453 of the first track must be moved in a forward direction indicated at 454 by reading and then rewriting each of the data sectors to a corresponding next sector. Therefore, a track detail object 455 required for reading TRACK_1 includes a file logical block address (FLBA) for sectors of TRACK_1 which are disposed in a forward direction relative to the reassign sector. Likewise, all data stored in each of the sectors of the last track TRACK_N disposed between and including a leading edge sector 456 of the last track TRACK_N and the spare sector 454 must be moved forward, and a track detail object 458 required for reading TRACK_N includes an FLBA for the sectors of TRACK_N up to but not including the spare sector.

For each of the intermediate tracks TRACK_2 ... TRACK_N–1, only the data stored in the first trailing edge non-skip sector of the intermediate track, identified by the corresponding last FLBA of the track, must be moved by reading and then rewriting to the first trailing edge non-skip data sector of the next track, as further explained below. Therefore, track detail objects 464, 466 required for each of the intermediate tracks TRACK_2 ... TRACK_N–1 include a last FLBA indicating the first trailing edge non-skip sector of the track. The data stored in the sector identified by the last FLBA of each intermediate track is read before it is overwritten during write traverse and filter operation described below.

FIG. 13B shows a reassign span track detail diagram including a reverse reassign span at 470 having a plurality of N sequential tracks for which a reverse read traverse and filter sub-process is executed in accordance with the reverse reassign process of the present invention. The depicted reassign span includes a first partial track TRACK_N having a reassign sector 472, a second partial track TRACK_1 having a spare sector 474 disposed in a reverse direction relative to the reassign sector, and a plurality of intermediate tracks TRACK_2 ... TRACK_N–1 disposed between the first and second partial tracks. The track detail objects required for executing the reverse reassign operation, are similar to the track detail objects required for the forward reassign operation. Track detail objects 476 and 478 required for the first and second partial tracks include FLBAs for sectors of the corresponding tracks including all sectors located between the spare sector and the reassign sector, including the reassign sector, but exclusive of the spare sector. That is, FLBAs are not provided for the spare sector. For each of the intermediate tracks TRACK_2 ... TRACK_N–1, the data stored in a corresponding first non-skip leading edge sector designated by a corresponding first FLBA must be moved to a first non-skip leading edge sector of a preceding track, as further explained below. Because only the data stored in the sector designated by a corresponding first FLBA of each of the intermediate tracks TRACK_2 ... TRACK_N–1 must be moved by reading and then rewriting, a corresponding track detail object 484, ..., 486 required for each of the intermediate tracks TRACK_2 ... TRACK_N–1 includes a corresponding first FLBA only.

FIG. 14A shows a flow diagram illustrating a process at 500 for executing the fast track forward reassign operation of the present invention, the process 500 beginning with a read traverse and filter sub-process 502 for reading the forward reassign span 450 (FIG. 13A). In the preferred embodiment, the process 500 is implemented as micro-code stored in RAM 130! and executed over processor 128 (FIG. 4) of the disk drive system 110 (FIG. 4) which uses the fast track reassign sector format conversion system 160 (FIG. 5). Note that in the alternative embodiment of the reassign process in which a high speed processor is used, the steps of the traverse and filter sub-process 502 are performed during a transfer "on the fly".

The read traverse and filter sub-process 502 begins with a step 504 in which a track detail object is fetched for a current track, beginning with the first track TRACK_1 (FIG. 13A). It is then determined at 506 whether the current track is an intermediate track of the forward reassign span 450 (FIG. 13A), that is whether the current track is disposed between the first partial track TRACK_1 having the reassign sector 452 and the second partial track TRACK_N having the closest spare sector 454 (FIG. 13A) associated with the reassign sector. If it is determined at 456 that the current track is not an intermediate track, but is rather one of the first and second partial tracks of the reassign span, the process proceeds to step 508 in which the current track detail object is put, as is, into a track detail queue stored in a buffer of the formatter electronics unit 126 (FIG. 4) without further processing.

If it is determined at 506 that the current track is an intermediate track, the process proceeds to step 509 in which the current track detail is post-processed for the sector of the current intermediate track which is indicated by the last FLBA of the track. For each of the intermediate tracks TRACK_2 ... TRACK_N–1 of the forward direction reassign span 450 (FIG. 13A), only the data stored in the corresponding first trailing edge non-skip sectors identified by the last FLBA of the track must be moved, and therefore, the track detail objects 464, ..., 466 required for each of the intermediate tracks TRACK_2 ... TRACK_N–1 is post-processed to include a last FLBA only.

In the post-processing step 509, the first trailing edge non-skip, sector of the current intermediate track may be determined according to Relationship (3), below, using information read from fields of the current track detail object 420 (FIG. 12) fetched in step 504, the current track detail object being associated with the current intermediate track.

$$\text{Last Sector of Track} = \text{Starting sector} + \text{Length} + \text{Skip Count} - 1 \quad (3)$$

Note that Relationship (3) is only true if trailing edge skips are not counted in the skip count. Input values for determining the last sector of the current track according to Relationship (3) are received from fields of the corresponding track detail object 420 (FIG. 12) including the starting sector field 432, length of transfer field 434, and skip count field 436 (FIG. 12).

Figure 1:
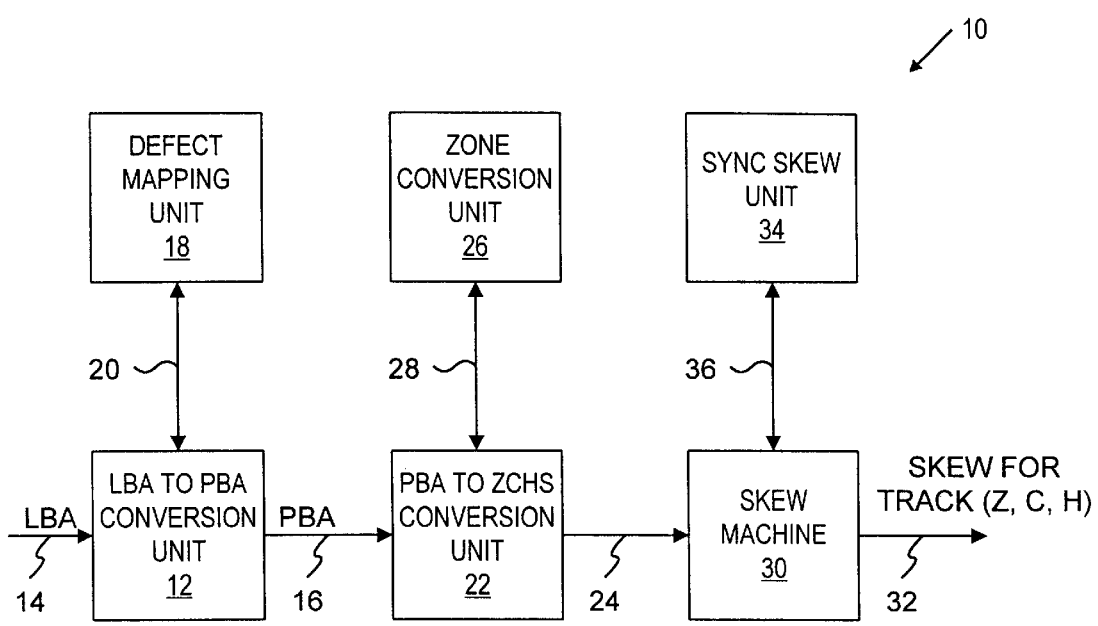
FIG. 1 is a block diagram illustrating a data sector format conversion system of a prior art disk drive system including zone bit recording and adaptive skewing features.

In the post-processing step 509, it is determined whether the last sector of the track is a skip sector by determining whether the last sector of the track is indicated by a last entry in the skip table, or defect map, of the defect mapping unit 18 (FIG. 1). As described above, the defect map takes account of skip sectors using the virtual track (VT) table having entries representing high order bits of the LBA, and the virtual sector (VS) table having entries representing the low order bits of the LBA.

It is then determined at 510 whether there are more tracks in the reassign span 450 (FIG. 13A), and if so, the process proceeds to step 512 to advance a pointer to a next track. From step 512, the process proceeds back to step 504 to fetch a track detail object for a current track, and then processes the track detail object in accordance with step 506 as described. Note that steps 504 through 512, which are repeated until the track detail queue includes a track detail object for each of the tracks of the forward reassign span 450 (FIG. 13A), are executed in a mode wherein data is not transferred after each track detail object is generated as in conventional transfer operations.

After it is determined at 510 that there are no more tracks in the forward reassign span, it is assumed that a track detail object for each track of the reassign span is queued in the buffer, and the process proceeds to step 514 in which the disk drive is set to operate in a fast track feed mode wherein the track detail objects previously stored in the buffer may be streamed out of the buffer for a fast transfer which may be executed within the skew time associated with the corresponding track. Note that in the alternative embodiment of the reassign process in which a high speed processor is used, the steps of the traverse and filter sub-process are performed during a transfer "on the fly", that is within the required skew times.

In step 516, the track detail objects are streamed out from the track detail queue and the data specified by the corresponding track detail objects is read from the tracks TRACK_1 to TRACK_N of the forward reassign span of the disk 112 (FIG. 4) and stored in a data buffer which is implemented by the RAM 130 (FIG. 4). The specified data is stored in the sectors indicated by corresponding FLBAs specified by the track detail objects (FIG. 13A) associated with all or a portion of the tracks TRACK_1 to TRACK_N of the reassign span. Because only a single sector of each of the intermediate tracks TRACK_2 to TRACK_N-1 (FIG. 13A) of the forward reassign span 450 (FIG. 13A) must be moved, a data buffer may be used which is large enough to store all the specified data. From step 516, the depicted process proceeds to "A" (to FIG. 16).

FIG. 14B shows a flow diagram illustrating a process at 500' for executing the fast track reverse reassign operation of the present invention, the process 500' beginning with a read traverse and filter sub-process 502' for reading the reverse reassign span 470 (FIG. 13B). In the preferred embodiment, the process 500' is implemented as micro-code stored in RAM 130 and executed over processor 128 (FIG. 4) of the disk drive system 110 (FIG. 4) which uses the fast track reassign sector format conversion system 160 (FIG. 5).

The read traverse and filter sub-process 502' begins with a step 504' in which a track detail object is fetched for a current track, beginning with the first track TRACK_1 (FIG. 13B). It is then determined at 506' whether the current track is an intermediate track of the reverse reassign span 470 (FIG. 13B), that is whether the current track is disposed between the first partial track TRACK_N having the reassign sector 472 and the second partial track TRACK_1 having the closest spare sector 474 (FIG. 13B) associated with the reassign sector. If it is determined at 456' that the current track is not an intermediate track, but is rather one of the first and second partial tracks of the reassign span, the process proceeds to step 508' in which the current track detail object is put, as is, into a track detail queue stored in a buffer of the formatter electronics unit 126 (FIG. 4) without further processing.

If it is determined at 506' that the current track is an intermediate track, the process proceeds to step 509' in which the current track detail is post-processed for the sector of the current intermediate track which is indicated by the first FLBA of the track. For each of the intermediate tracks TRACK_2 ... TRACK_N-1 of the reverse reassign span 470 (FIG. 13B), only the data stored in the corresponding first leading edge non-skip sectors identified by the first FLBA of the track must be moved, and therefore, the track detail objects 484, ..., 486 required for each of the intermediate tracks TRACK_2 ... TRACK_N-1 are post-processed to include a first FLBA only.

In the post-processing step 509', it is determined whether the leading edge sector of the track is a skip sector by determining whether the leading edge sector is indicated by a first entry in the skip table, or defect map, of the defect mapping unit 188 (FIG. 1).

It is then determined at 510' whether there are more tracks in the reverse reassign span 470 (FIG. 13B), and if so, the process proceeds to step 512' to advance a pointer to a next track. From step 512', the process proceeds back to step 504' to fetch a track detail object for a current track, and then processes the track detail object in accordance with step 506' as described. Note that steps 504 through 512, which are repeated until the track detail queue includes a track detail object for each of the tracks of the reverse reassign span 470 (FIG. 13B), are executed in a mode wherein data is not transferred after each track detail object is generated as in conventional transfer operations.

After it is determined at 510' that there are no more tracks in the reverse reassign span, it is assumed that a track detail object for each track of the reassign span is queued in the buffer, and the process proceeds to step 514' in which the disk drive is set to operate in a fast track feed mode wherein the track detail objects previously stored in the buffer may be streamed out of the buffer for a fast transfer which may be executed within the skew time associated with the corresponding track. As mentioned above, in the alternative embodiment of the reassign process, a high speed processor may be used to perform the necessary track detail calculations during a transfer "on the fly" wherein track detail objects need not be generated and stored for each track prior to the transfer of data.

In step 516', the track detail objects are streamed out from the track detail queue and the data specified by the corresponding track detail objects is read from the tracks TRACK_1 to TRACK_N of the reverse reassign span of the disk 112 (FIG. 4) and stored in a data buffer which is implemented by the RAM 130 (FIG. 4). The specified data is stored in the sectors indicated by corresponding FLBAs specified by the track detail objects (FIG. 13B) associated with all or a portion of the tracks TRACK_1 to TRACK_N of the reassign span. Because only a single sector of each of the intermediate tracks TRACK_2 to TRACK_N-1 (FIG. 13B) of the reverse reassign span 470 (FIG. 13B) must be moved, a data buffer may be used which is large enough to store all the specified data. From step 516', the depicted process proceeds to "A" (to FIG. 16).

FIG. 15A is a block diagram illustrating at 550 contents 552 of the data buffer and contents 554 of the track detail queue buffer after execution of the forward read traverse and filter sub-process 502 (FIG. 14A) for the forward reassign span 450 (FIG. 13A). The lines drawn from sectors of the contents 552 stored in the data buffer to corresponding track detail objects of the contents 554 stored in the track detail queue indicate corresponding relationships between sectors of tracks and track detail objects.

FIG. 15B is a block diagram illustrating at 560 contents 562 of the data buffer and contents 564 of the track detail queue buffer after execution of the reverse read traverse and filter sub-process 502' (FIG. 14B) of the reverse reassign process 500 (FIG. 14B) for the reverse reassign span 470 (FIG. 13B). The lines drawn from sectors of the contents 562 stored in the data buffer to corresponding track detail objects of the contents 564 stored in the track detail queue indicate corresponding relationships between sectors of tracks and track detail objects.

FIG. 16 shows a flow diagram illustrating a fast track feed mode writing sub-process at 570 of the process 500 (FIGS. 14A and 14B) for executing the fast track reassign operation of the present invention. The depicted sub-process 570 proceeds from "A" (from FIGS. 14A or 14B) to step 574 in which the fast track feed mode is reset. In step 576, data specified by the corresponding track detail objects is read from the data buffer to a reserved area of the disk 110 (FIG. 4). In step 522, a checkpoint is set. From step 578, the depicted process proceeds to "B" (to FIGS. 17A and 17B).

FIG. 17A shows a flow diagram illustrating a defect table and skew table updating sub-process at 600 of the forward direction fast track reassign process 500 (FIG. 14A) of the present invention, the sub-process 600 for updating the defect and skew tables of the defect unit 168 (FIG. 5) and reassign skew unit 188 (FIG. 5) respectively for the forward direction reassign span 450 (FIG. 13A). The depicted process proceeds from "B" (from FIG. 16) and proceeds to step 602 in which a track detail object is fetched for a current track of the forward reassign span, beginning with the first partial track TRACK_1 (FIG. 13A). It is then determined at 604 whether the current track is an intermediate track of the forward reassign span. If it is determined at 604 that the current track is not an intermediate track, but is rather one of the first and second partial tracks of the reassign span, the process proceeds to step 606 in which virtual sector (VS) entries (associated with sectors greater than the reassign FLBA and less than the spare sector) of the defect map of the defect unit 168 (FIG. 5) are decremented for the current track.

From step 606, the process proceeds to determine at 608 whether there are more tracks in the forward reassign span, and if so, the process proceeds to step 610 to advance a pointer to a next track. From step 610, the process proceeds back to step 602 to fetch a track detail object for a current track, and process the track detail object in accordance with step 604 as described.

If it is determined at 604 that the current track is an intermediate track, the process proceeds to step 612 in which VS entries associated with trailing edge skip sectors of the intermediate tracks (FIG. 13A) of the defect map are renumbered with the first FLBA of the track+1.

In step 614, the VS entries corresponding with trailing edge skip sectors of the current intermediate track are removed and inserted before with VS entries corresponding with prior sectors on the same intermediate track, if any.

In step 616, the reassign skew table of the reassign skew unit 188 (FIG. 4) is updated with the negative delta skew value (number of trailing edge skips+1) for the current intermediate track. From step 616, the process proceeds to 608 as described above. If it is determined at 608 that there are no more tracks in the current reassign span, the process proceeds to "C" (to FIG. 19A).

FIG. 17B shows a flow diagram illustrating a defect table and skew table updating sub-process at 620 of the reverse reassign process 500' (FIG. 14B) of the present invention, the sub-process 620 for updating the defect and skew tables of the defect unit 168 (FIG. 5) and reassign skew unit 188 (FIG. 5) respectively for the reverse reassign span 470 (FIG. 13B). The depicted process proceeds from "B" (from FIG. 16) and proceeds to step 622 in which a track detail object is fetched for a current track of the reverse reassign span, beginning with the first track TRACK_1 (FIG. 13B ). It is then determined at 624 whether the current track is an intermediate track of the reverse reassign span.

If it is determined at 624 that the current track is not an intermediate track, but is rather one of the first and second partial tracks of the reassign span, the process proceeds to step 626 in which virtual sector (VS) entries (associated with sectors greater than the spare sector and less than the reassign sector) of the defect map of the defect unit 168 (FIG. 5) are incremented for the current track. From step 626, the process proceeds to determine at 628 whether there are more tracks in the reverse reassign span 470 (FIG. 13B), and if so, the process proceeds to step 630 to advance a pointer to a next track of the reverse reassign span 470 (FIG. 13B). From step 630, the process proceeds back to step 622 to fetch a track detail object for a current track, and the track detail object is then processed in accordance with step 624 as described.

If it is determined at 624 that the current track is an intermediate track, the process proceeds to step 632 in which VS entries of the defect map associated with leading edge skip sectors of the intermediate tracks are renumbered with the last FLBA of the track (for the reverse case). In step 634, the VS entries of the defect map corresponding with leading edge skip sectors of the current intermediate track are removed and inserted after VS entries corresponding with subsequent sectors on the same current intermediate track.

In step 636, the reassign skew table of the reassign skew unit 188 (FIG. 4) is appended with the delta skew value for the current intermediate track which is determined as described above. From step 636, the process proceeds to 628 as described above. If it is determined at 628 that there are no more tracks in the reverse reassign span, the process proceeds to "C" (to FIG. 19B).

FIG. 18A is a reassign span track detail diagram illustrating a forward direction reassign span 650 having a plurality of N sequential tracks of the disk drive system 110 (FIG. 4) written in accordance with a forward write traverse and filter sub-process of the forward reassign operation of the present invention. The depicted reassign span includes: a first partial track TRACK_1', corresponding with TRACK_1 (FIG. 13A), and having a sector 652 which is marked defective and which corresponds with the reassign sector 452 (FIG. 13A); a second partial track TRACK_N', corresponding with TRACK_N (FIG. 13A), disposed in a forward direction indicated at 453 relative to the defective sector 652, and having a removed spare sector 654 corresponding with the spare sector 454 (FIG. 13A); and a plurality of intermediate skewed tracks TRACK_2' . . . TRACK_N-1' disposed between the first and second partial tracks. Each of the intermediate skewed tracks is skewed by a corresponding skew delta adjustment value. In the depicted example, each of the intermediate tracks is adjusted by one sector.

A track detail object 656 used for writing TRACK_1' includes an FLBA for each sector of TRACK_1'. A track detail object 658 used for writing TRACK_N' includes an FLBA for each sector of TRACK_N'. For each of the intermediate tracks TRACK_2' . . . TRACK_N-1', a corresponding track detail object 664, . . . , 666 required for writing each of the intermediate tracks TRACK_2' . . . TRACK_N-1' includes a first FLBA. The first FLBA indicates a leading edge non-skip sector of the corresponding skewed track. This sector corresponds to the first trailing edge non-skip sector of the corresponding unskewed track (FIG. 13A).

FIG. 18B is a reassign span track detail diagram illustrating a reverse reassign span 670 including a plurality of N sequential tracks written in accordance with a reverse write traverse and filter sub-process of the reverse reassign process of the present invention. The depicted reassign span includes a first partial track TRACK_N' having a defective sector 672 which is marked as defective, and which corresponds with the reassign sector 472 (FIG. 13B), a second partial track TRACK_1' having a removed spare sector 674 corresponding with the spare sector 474 (FIG. 13B) disposed in a reverse direction, and a plurality of skewed intermediate tracks TRACK_2' . . . TRACK_N-1' disposed between the first and second partial tracks. Each of the intermediate skewed tracks is skewed by a corresponding skew delta adjustment value. In the depicted example, each of the intermediate tracks is adjusted by one sector.

Track detail objects 676 and 678 required for the first and second partial tracks include an FLBA for each sector of the corresponding track in the span of the reassign. Track detail object 684, . . . , 686 required for the intermediate tracks TRACK_2 . . . TRACK_N-1 each include a corresponding last FLBA. The last FLBA indicates a trailing edge non-skip sector of the corresponding skewed track. This sector corresponds to the first leading edge non-skip sector of the corresponding unskewed track (FIG. 13B).

FIG. 19A shows a flow diagram illustrating a write traverse and filter sub-process at 700 for writing the forward reassign span 650 of FIG. 18A in accordance with the forward reassign process of the present invention.

The write traverse and filter sub-process 700 proceeds from "C" (from 17A) to step 702 in which a track detail object is fetched for writing a current track, beginning with the first track TRACK_1' (FIG. 18A). It is then determined at 704 whether the current track is an intermediate track of the reassign span. If it is determined at 704 that the current track is not an intermediate track, but is rather one of the first and second partial tracks of the reassign span, the process proceeds to step 706 in which the current track detail object is put into the track detail queue stored in a buffer of the formatter electronics unit 126 (FIG. 4).

If it is determined at 704 that the current track is an intermediate track, the process proceeds to step 707 in which the current track detail is post-processed for the corresponding leading edge 660, . . . , 662 (FIG. 18A) of the current intermediate track for the forward reassign span 650 of FIG. 18A.

For each of the intermediate skewed tracks TRACK_2' . . . TRACK_N-'1 of the forward direction reassign span 650 (FIG. 18A), data is written only to the corresponding leading edge non-skip data sectors 660, . . . , 662, and therefore, the corresponding track detail object 664, . . . , 666 required for writing each of the skewed intermediate tracks TRACK_2' . . . TRACK_N-1' includes an FLBA for the first non-skip sector only.

In the post-processing step 707, the leading edge sector of the current skewed intermediate track is determined using Relationship (4), below, using information read from fields of the current track detail object 420 (FIG. 12) fetched in step 702, the current track detail object being associated with the current intermediate track.

First Sector of Track=Starting sector+Contiguous Leading Edge Skip Count    (4)

Input values for determining the first sector of the current track according to Relationship (4) are received from fields of the corresponding track detail object 420 (FIG. 12) including the starting sector field 432, length of transfer field 434, and skip count field 436 and the table of skip sectors 440.

It is then determined at 708 whether there are more tracks in the reassign span, and if so, the process proceeds to step 710 to advance a pointer to a next track. From step 710, the process proceeds back to step 702 to fetch a track detail object for current track and process the track detail object in accordance with steps 704 and 707 as described. Note that steps 702 through 710, which are repeated until the track detail queue includes a track detail object for each of the tracks of the reassign operation, are executed in a mode wherein data is not transferred after each track detail object is generated as in conventional transfer operations.

After it is determined at 708 that there are no more tracks in the reassign span, it is assumed that a track detail object for each track of the reassign span is queued in the buffer, and the process proceeds to step 712 in which the disk drive is set to operate in a fast track feed mode wherein the track detail objects may be streamed out of the buffer for a fast transfer which may be executed within the skew time associated with the corresponding track.

In step 714, the track detail objects are streamed out from the track detail queue and the data specified by the track detail objects is written from the buffer to the skewed tracks TRACK_1' to TRACK_N' of the reassign span 650.

FIG. 19B shows a flow diagram illustrating a reverse write traverse and filter sub-process at 700' for writing the reverse reassign span 670 (FIG. 18B) in accordance with the fast track reassign operation of the present invention.

The reverse write traverse and filter sub-process 700', which is similar to the forward write traverse and filter sub-process 700, proceeds from "C" (from FIG. 17B) to step 702' in which a track detail object is fetched for writing a current track, beginning with a first track TRACK_1'. Steps 704' and 706' are similar to steps 704 and 706 of the forward writing sub-process 700 (FIG. 19A).

If it is determined at 704' that the current track is an intermediate track, the process proceeds to step 707' in which the current track detail is post-processed for the last sector of the current intermediate track of the reverse reassign span 670 (FIG. 18B). For each of the intermediate rotated tracks TRACK_2' . . . TRACK_N-'1 of the reverse reassign span 670 (FIG. 18B), data is written only to the trailing edge sector and therefore, the track detail object required for writing to each of the intermediate tracks TRACK_2' . . . TRACK_N-1' includes a last FLBA only.

FIG. 20 is a graph illustrating relationships between the time required for executing a reassign operation versus the number of tracks between the reassign sector and corresponding spare sector. The time required for executing a reassign operation is represented by the Y axis. The number of tracks between the reassign sector and corresponding spare sector is represented by the X axis. The constant slope curve 752 represents the time required for executing a prior art in line reassign operation as a function of the number of tracks between the reassign sector and corresponding spare sector in an exemplary disk drive system. The curve 754 represents the time required for executing a fast track reassign operation of the present invention as a function of the number of tracks between the reassign sector and corresponding spare sector. The curve 756 represents the gain in time required for executing the fast track reassign operation of the present invention versus the time required for executing a prior art in line reassign operation as a function of the number of tracks between the reassign sector and corresponding spare sector in the exemplary disk drive system.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A reassign process in a disk drive system including a plurality of tracks for storing data, each of said tracks divided into a plurality of sectors, each of said sectors having a corresponding logical address value associated therewith, each said track having a corresponding skew associated therewith and having a nominal skew value providing adequate time for sequential access of said corresponding track from a sequentially preceding track, said reassign process being operative to reassign data sectors stored in a reassign span including a first partial track having a reassign sector, a second partial track having a spare sector corresponding with said reassign sector, and at least one intermediate track disposed between said first and second partial tracks, said reassign process comprising the step of:

adjusting said nominal skew value of at least one of said intermediate tracks by a corresponding skew delta adjustment value so that said logical address values associated with said sectors of said intermediate track are transposed thereby effectively shifting data stored in selected sectors of said intermediate track in a direction of said spare sector relative to said reassign sector.

2. A reassign process as recited in claim 1 wherein:

if said reassign sector sequentially precedes said corresponding spare sector, said step of adjusting said nominal skew value comprises decreasing said nominal skew value by said corresponding skew delta adjustment value; and if said spare sector sequentially precedes said corresponding reassign sector, said step of adjusting said nominal skew value comprises increasing said nominal skew value by said corresponding skew delta adjustment value.

3. A reassign process as recited in claim 2 wherein:

if said reassign sector sequentially precedes said corresponding spare sector, said skew delta adjustment value is determined by determining the number of sectors between a leading edge sector of said intermediate track and a first trailing edge non-skip sector of said intermediate track; and if said spare sector sequentially precedes said corresponding reassign sector, said skew delta adjustment value is determined by determining the number of sectors between a trailing edge sector of said intermediate track and a first non-skip leading edge sector of said intermediate track.

4. A reassign process as recited in claim 3 further comprising the steps of:

if said reassign sector sequentially precedes said corresponding spare sector, reading data from said first trailing edge non-skip sector of said intermediate track, and writing said data to a selected sector of a succeeding track; and if said spare sector sequentially precedes said corresponding reassign sector, reading data from said first non-skip leading edge sector of said intermediate track, and writing said data to a selected sector of a preceding track.

5. A reassign process as recited in claim 4 wherein:

if said reassign sector sequentially precedes said corresponding spare sector, said succeeding track is a succeeding intermediate track which is skewed by said corresponding skew delta adjustment value, and said selected sector of said succeeding intermediate track is a first trailing edge non-skip sector of said succeeding intermediate track; and if said spare sector sequentially precedes said corresponding reassign sector, said preceding track is a preceding intermediate track which is skewed by said corresponding skew delta adjustment value, and said selected sector is a first leading edge non-skip sector of said preceding intermediate track.

6. A reassign process as recited in claim 4 wherein if said reassign sector sequentially precedes said corresponding spare sector, said step of reading data from said first trailing edge non-skip sector of said intermediate track comprises:

reading a track detail object associated with said intermediate track from a memory storage device of said disk drive system;

post processing said track detail object so that it specifies a transfer of only said first trailing edge non-skip sector of said intermediate track;

storing said track detail object in a track detail queue in a memory storage device of said disk drive system;

setting a fast track feed mode enabling streaming of said track detail object from said track detail queue; and reading said data into a data buffer of said disk drive system by transferring said data as specified by said track detail object.

7. A reassign process as recited in claim 4 wherein if said spare sector sequentially precedes said corresponding reassign sector, said step of reading data from said first non-skip leading edge sector of said intermediate track comprises:

reading a track detail object associated with said intermediate track from a memory storage device of said disk drive system;

post processing said track detail object so that it specifies a transfer of only said first leading edge non-skip sector of said intermediate track;

storing said track detail object in a track detail queue in a memory storage device of said disk drive system;

setting a fast track feed mode enabling streaming of said track detail object from said track detail queue; and reading said data into a data buffer of said disk drive system by transferring said data as specified by said track detail object.

8. A disk drive system including:

a plurality of tracks for storing data, each of said tracks divided into a plurality of sectors, each of said sectors having a corresponding logical address value associated therewith, each said track having a corresponding skew associated therewith and having a nominal skew value providing adequate time for sequential access of said corresponding track from a sequentially preceding track; and control means operative to perform a reassign process for reassigning data sectors stored in a reassign span including a first partial track having a reassign sector, a second partial track having a spare sector corresponding with said reassign sector, and at least one intermediate track disposed between said first and second partial tracks, said reassign process including the step of adjusting said nominal skew value of at least one of said intermediate tracks by a corresponding skew delta adjustment value so that said logical address values associated with said sectors of said intermediate track are transposed thereby effectively shifting data stored in selected sectors of said intermediate track in a direction of said spare sector relative to said reassign sector.

9. A disk drive system as recited in claim 8 further comprising memory storage means for storing:
   a defect map including information indicative of the location of defective sectors;
   a reassign skew table including said skew delta adjustment values corresponding with said at least one intermediate track; and
   customer data.

10. A disk drive system as recited in claim 8 wherein said reassign process performed by said control means further comprises the steps of:
   if said reassign sector sequentially precedes said corresponding spare sector, said step of adjusting said nominal skew value comprises decreasing said nominal skew value by said corresponding skew delta adjustment value, and said skew delta adjustment value is determined based on the number of sectors between a leading edge sector of said intermediate track and a first trailing edge non-skip sector of said intermediate track; and
   if said spare sector sequentially precedes said corresponding reassign sector, said step of adjusting said nominal skew value comprises increasing said nominal skew value by said corresponding skew delta adjustment value, and said skew delta adjustment value associated with said intermediate track is determined based on the number of sectors between a trailing edge sector of said intermediate track and a first non-skip leading edge sector of said intermediate track.

11. A disk drive system as recited in claim 9 wherein said reassign process performed by said control means further comprises the steps of:
   if said reassign sector sequentially precedes said corresponding spare sector, reading data from said first trailing edge non-skip sector of said intermediate track, updating said defect map and said reassign skew table, and writing said data to a selected sector of a succeeding track; and
   if said spare sector sequentially precedes said corresponding reassign sector, reading data from said first non-skip leading edge sector of said intermediate track, updating said defect map and said reassign skew table, and writing said data to a selected sector of a preceding track.

12. A disk drive system as recited in claim 10 wherein:
   if said reassign sector sequentially precedes said corresponding spare sector, said succeeding track is a succeeding intermediate track, and said selected sector of said succeeding intermediate track is a first trailing edge non-skip sector of said succeeding intermediate track; and
   if said spare sector sequentially precedes said corresponding reassign sector, said preceding track is a preceding intermediate track, and said selected sector of said preceding intermediate track is a first trailing edge non-skip sector of said preceding intermediate track.

13. A reassign process as recited in claim 11 wherein if said reassign sector sequentially precedes said corresponding spare sector, said step of reading data from said first trailing edge non-skip sector of said intermediate track comprises:
   reading a track detail object associated with said intermediate track from said memory storage means;
   post processing said track detail object so that it specifies a transfer of only said first trailing edge non-skip sector of said intermediate track;
   storing said track detail object in a track detail queue in said memory storage means of said disk drive system;
   setting a fast track feed mode enabling streaming of said track detail object from said track detail queue; and
   reading said data into said memory storage means by transferring said data as specified by said track detail object.

14. A reassign process as recited in claim 11 wherein if said spare sector sequentially precedes said corresponding reassign sector, said step of reading data from said first non-skip leading edge sector of said intermediate track comprises:
   reading a track detail object associated with said intermediate track from said memory storage means;
   post processing said track detail object so that it specifies a transfer of only said first leading edge non-skip sector of said intermediate track;
   storing said track detail object in a track detail queue in said memory storage means;
   setting a fast track feed mode enabling streaming of said track detail object from said track detail queue; and
   reading said data into said memory storage means by transferring said data as specified by said track detail object.

15. A machine readable storage device having stored therein encoding instructions for executing a reassign process in a disk drive system including a plurality of tracks for storing data, each of said tracks divided into a plurality of sectors, each of said sectors having a corresponding logical address value associated therewith, each said track having a corresponding skew associated therewith and having a nominal skew value providing adequate time for sequential access of said corresponding track from a sequentially preceding track, said reassign process being operative to reassign data sectors stored in a reassign span including a first partial track having a reassign sector, a second partial track having a spare sector corresponding with said reassign sector, and at least one intermediate track disposed between said first and second partial tracks, said reassign process comprising the step of:
   adjusting said nominal skew value of at least one of said intermediate tracks by a corresponding skew delta adjustment value so that said logical address values associated with said sectors of said intermediate track are transposed thereby effectively shifting data stored in selected sectors of said intermediate track in a direction of said spare sector relative to said reassign sector.

16. A machine readable storage device as recited in claim 15 wherein:
   if said reassign sector sequentially precedes said corresponding spare sector, said step of adjusting said nominal skew value comprises decreasing said nominal skew value by said corresponding skew delta adjustment value; and
   if said spare sector sequentially precedes said corresponding reassign sector, said step of adjusting said nominal skew value comprises increasing said nominal skew value by said corresponding skew delta adjustment value.

17. A machine readable storage device as recited in claim 16 wherein:
- if said reassign sector sequentially precedes said corresponding spare sector, said skew delta adjustment value is determined by determining the number of sectors between a leading edge sector of said intermediate track and a first trailing edge non-skip sector of said intermediate track; and
- if said spare sector sequentially precedes said corresponding reassign sector, said skew delta adjustment value is determined by determining the number of sectors between a trailing edge sector of said intermediate track and a first non-skip leading edge sector of said intermediate track.

18. A machine readable storage device as recited in claim 17 further comprising the steps of:
- if said reassign sector sequentially precedes said corresponding spare sector, reading data from said first trailing edge non-skip sector of said intermediate track, and writing said data to a selected sector of a succeeding track; and
- if said spare sector sequentially precedes said corresponding reassign sector, reading data from said first non-skip leading edge sector of said intermediate track, and writing said data to a selected sector of a preceding track.

19. A machine readable storage device as recited in claim 18 wherein:
- if said reassign sector sequentially precedes said corresponding spare sector, said succeeding track is a succeeding intermediate track which is skewed by said corresponding skew delta adjustment value, and said selected sector of said succeeding intermediate track is a first trailing edge non-skip sector of said succeeding intermediate track; and
- if said spare sector sequentially precedes said corresponding reassign sector, said preceding track is a preceding intermediate track which is skewed by said corresponding skew delta adjustment value, and said selected sector is a first trailing edge non-skip sector of said preceding intermediate track.

20. A machine readable storage device as recited in claim 18 wherein if said reassign sector sequentially precedes said corresponding spare sector, said step of reading data from said first trailing edge non-skip sector of said intermediate track comprises:
- reading a track detail object associated with said intermediate track from a memory storage device of said disk drive system;
- post processing said track detail object so that it specifies a transfer of only said first trailing edge non-skip sector of said intermediate track;
- storing said track detail object in a track detail queue in a memory storage device of said disk drive system;
- setting a fast track feed mode enabling streaming of said track detail object from said track detail queue; and
- reading said data into a data buffer of said disk drive system by transferring said data as specified by said track detail object.

21. A machine readable storage device as recited in claim 18 wherein if said spare sector sequentially precedes said corresponding reassign sector, said step of reading data from said first non-skip leading edge sector of said intermediate track comprises:
- reading a track detail object associated with said intermediate track from a memory storage device of said disk drive system;
- post processing said track detail object so that it specifies a transfer of only said first leading edge non-skip sector of said intermediate track;
- storing said track detail object in a track detail queue in a memory storage device of said disk drive system;
- setting a fast track feed mode enabling streaming of said track detail object from said track detail queue; and
- reading said data into a data buffer of said disk drive system by transferring said data as specified by said track detail object.

* * * * *